(12) United States Patent
Pahlevaninezhad et al.

(10) Patent No.: US 12,237,688 B2
(45) Date of Patent: Feb. 25, 2025

(54) INTEGRATING ENERGY STORAGE UNITS IN CONVERTERS FOR USE IN PV-BASED INVERTERS

(71) Applicant: SPARQ SYSTEMS INC., Kingston (CA)

(72) Inventors: Majid Pahlevaninezhad, Kingston (CA); Praveen Jain, Kingston (CA)

(73) Assignee: Sparq Systems Inc., Kingston (CA)

( * ) Notice: Subject to any disclaimer, the term of this patent is extended or adjusted under 35 U.S.C. 154(b) by 274 days.

(21) Appl. No.: 17/993,940

(22) Filed: Nov. 24, 2022

(65) Prior Publication Data

US 2024/0178670 A1    May 30, 2024

(51) Int. Cl.
*H02J 3/38* (2006.01)
*G05F 1/67* (2006.01)
*H02J 7/35* (2006.01)
*H02M 3/335* (2006.01)

(52) U.S. Cl.
CPC ............... *H02J 3/381* (2013.01); *G05F 1/67* (2013.01); *H02J 7/35* (2013.01); *H02M 3/33571* (2021.05); *H02M 3/33573* (2021.05); *H02J 2300/26* (2020.01)

(58) Field of Classification Search
CPC ........ H02J 7/35; H02J 3/381; H02M 3/33571; H02M 3/33573; G05F 1/67
See application file for complete search history.

(56) References Cited

U.S. PATENT DOCUMENTS

| | | | |
|---|---|---|---|
| 2009/0283129 A1* | 11/2009 | Foss ...................... | H02M 7/493 136/244 |
| 2015/0311708 A1* | 10/2015 | Tao ......................... | H02J 3/381 307/82 |
| 2016/0372926 A1* | 12/2016 | Pahlevaninezhad .... | H02J 3/381 |
| 2019/0148948 A1* | 5/2019 | Liu ......................... | H02M 3/01 136/244 |
| 2019/0199100 A1* | 6/2019 | Kadota ................. | H02J 7/0013 |

* cited by examiner

Primary Examiner — Jue Zhang
(74) Attorney, Agent, or Firm — BRION RAFFOUL

(57) ABSTRACT

Systems and methods relating to the integration of energy storage subsystems into components for use with systems that harvest energy from PV panels and convert that energy for use with a power grid. Various configurations of converters that integrate energy storage cells and the inverters that use such converters are presented. Half-bridge and full bridge configurations for the converters are presented. The integrated energy storage cells may be battery cells, supercapacitor cells, or a combination of the two. Digital control systems for controlling the converters as well as the charge and discharge cycles for the energy storage cells are also presented.

28 Claims, 17 Drawing Sheets

INTEGRATING ENERGY STORAGE UNITS IN CONVERTERS FOR USE IN PV-BASED INVERTERS

TECHNICAL FIELD

The present invention relates to power generation. More specifically, the present invention relates to the integration of energy storage units with converters that are to be used with inverters coupled to PV panels.

BACKGROUND

There is a growing number of photovoltaic (PV) applications where direct current/alternating current (DC/AC) inverters are required to provide maximum power point tracking (MPPT) to harvest maximum solar energy from PV panels and to thereby feed clean AC electricity into the power grid. However, the energy generated by solar energy harvesting systems depends on weather conditions and can be quite intermittent. Energy storage systems can effectively resolve this issue of intermittent energy from solar energy harvesting systems by storing harvested energy and then releasing that stored energy when needed.

Commonly, to address the above issue, two different power electronic converters are used—one for the PV system and one for the energy storage system. FIG. 1 is a block diagram of an existing solar energy harvesting systems with energy storage capability according to the prior art. According to FIG. 1, two separate power electronic converters are used in the system. The PV inverter is used to perform MPPT for the PV panels and to convert the harvested energy into an AC form that is compatible with the AC grid. The battery/energy storage inverter controls the charge-discharge of the energy storage and converts power from DC to AC. The main issue with this architecture is that two separate power electronic converters are needed and the system may not be cost-effective. Also, when two separate power converters are used, the PV inverter does not have the real-time information of the battery (e.g., state of charge, etc.) and the battery inverter does not have the real-time information of the PV system (e.g., available power, etc.). Thus, this architecture is unable to optimise the power flow between the different components of the system (i.e., PV, battery, Grid, and loads).

In order to address the above issues, other architectures that can combine both the PV system and the battery system were introduced. FIG. 2 shows an exemplary arrangement of such an architecture according to the prior art. According to FIG. 2, the power electronic converter includes a DC/DC converter between the PV panels and the battery/energy storage unit, a DC/AC inverter to convert DC power into AC power, and a low frequency transformer to increase the voltage and provide galvanic isolation between the grid and the system. In this architecture, the primary side of the transformer is low voltage (e.g., ~48V) and the secondary side is high voltage (~240V). Thus, the electronic components that are used in the system can have low voltage ratings. The main drawback of this architecture is the low frequency transformer. This transformer is very bulky, heavy, and has significant losses. Thus, this architecture cannot be used for higher power (i.e., greater than a few kW) and is not very scalable in terms of power.

In order to eliminate the low frequency transformer, the DC/DC converter can be designed to provide isolation. FIG. 3 shows such an architecture according to the prior art and does not include a low frequency transformer. According to this figure, the DC/DC converter provides enough gain as well as the galvanic isolation between the system and the grid. Thus, high efficiency and high-power density can be achieved with this architecture. However, the energy storage needs to be high voltage (i.e., higher than the peak voltage of the grid voltage). For instance, if the inverter is designed to operate with the universal voltage range (e.g., Vrms(max) =264 volts, Vpeak=372 volts), the minimum voltage of the energy storage should be fairly high (e.g., ~400V). Thus, the voltage range of the energy storage unit is very limited, and many types of batteries cannot be used in this architecture. Also, this architecture may have lower reliability due to the high voltage requirements for the energy storage unit.

The other problem with this architecture is that the battery pack must operate at a high voltage (~400V). This has a substantial detrimental impact on the reliability and cost of the system. FIG. 4 shows a typical high voltage battery pack according to the prior art. According to his figure, the battery pack includes multiple strings of battery cells, with the strings being coupled in parallel to provide the required voltage level. Thus, a complicated battery management system (BMS) is needed in case some of the battery cells or battery cell strings deteriorate or get corrupted. Also, the system must be designed with significant margins for storage capacity (i.e., many extra cells) in order to comply with reliability requirements. Additionally, the battery pack requires complex thermal management as the cells are placed in a pack and each cell generates heat. Thus, an effective heat removal system or method must be devised for the battery pack in order to achieve reliable operation of the energy storage system. These issues increase the overall cost of the system and can jeopardize system reliability.

The energy storage unit can be based on various storage technologies. FIG. 5 shows an energy storage unit according to the prior art that is based on supercapacitor technology. According to this figure, strings of supercapacitors are placed in parallel to provide high storage capacity. This configuration of strings of supercapacitors also provides redundancy and reliability for the storage unit. However, this configuration has similar issues to the battery-based energy storage unit. As with the battery-based system, this supercapacitor-based energy storage unit multiple strings of energy storage cells (supercapacitors) placed in parallel to provide the required voltage level. Thus, a supercapacitor voltage balancer is required to guarantee that the voltage across each cell does not reach beyond its maximum value (currently the maximum voltage for a typical supercapacitor cell is less than 4V).

In both energy storage unit configurations (as illustrated in FIG. 4 and FIG. 5), additional electronics (i.e., a battery management system for battery packs and a voltage balancer for supercapacitor-based units) are required. In addition, complex thermal management is needed to provide a reliable energy storage solution. The energy storage unit can then be connected to other electronic circuitry to provide power/energy. The above requirements to achieve sufficient reliability render the current energy storage solutions very costly.

Based on the above, there is therefore a need for systems and devices which mitigate if not avoid the shortcomings of the prior art.

SUMMARY

The present invention provides systems and methods relating to the integration of energy storage subsystems into components for use with systems that harvest energy from PV panels and convert that energy for use with a power grid. Various configurations of converters that integrate energy storage cells and the inverters that use such converters are presented. Half-bridge and full bridge configurations for the converters are presented. The integrated energy storage cells may be battery cells, supercapacitor cells, or a combination of the two. Digital control systems for controlling the converters as well as the charge and discharge cycles for the energy storage cells are also presented.

In a first aspect, the present invention provides a micro-inverter system for receiving input DC power and for producing AC power suitable for an AC power grid, the system comprising:
- a plurality of multi-level current driven DC/DC converters, each of said plurality of DC/DC converters receiving said input DC power from DC power sources, at least one of said plurality of DC/DC converters comprising an integrated energy storage subsystem;
- a DC/AC inverter receiving outputs of said plurality of DC/DC converters and producing said AC power, an output of said DC/AC inverter being received by said AC power grid;
- a differential geometric control system for controlling said DC/AC inverter and for controlling said plurality of DC/DC converters;

wherein said control system controls each of said plurality of DC/DC converters to perform maximum power point tracking to extract maximum input DC power from said DC power sources.

In a second aspect, the present invention provides a DC/DC converter comprising:
- a transformer having a primary side and a secondary side, said primary side of said transformer receiving an input current, said secondary side of said transformer producing an output current;
- a plurality of pairs of circuit element modules, each of said circuit element modules comprising a semiconductor;
- a plurality of energy storage sub-circuits, each energy storage sub-circuit being associated with a specific pair of circuit element modules;
- a pair of input capacitors coupled in series to each other;
- an input inductor;
- two pairs of diodes, each pair of diodes being coupled in series;
- a first output capacitor and a second output capacitor;

wherein
  each of said plurality of pairs of circuit element modules is coupled in series to other circuit element modules to form a chain of circuit element modules;
  each energy storage sub-circuit is coupled between a first coupling point and a second coupling point in said chain of circuit element modules and each energy storage subcircuit and each pair of circuit element modules are arranged in said chain such that for each specific energy storage subcircuit, a specific pair of circuit element modules associated with said specific energy storage subcircuit is coupled in said chain between a specific first coupling point and a specific second coupling point between which said specific energy storage sub-circuit is coupled;
and wherein
  on said primary side of said transformer, said DC/DC converter comprises:
    said pair of input capacitors being coupled in parallel to said chain;
    said input inductor is coupled between a first end of said transformer primary side and a first coupling point that is in a middle of said chain;
    a second end of said transformer primary side is coupled to a second coupling point that is between said pair of input capacitors
    an input is coupled in parallel to said pair of input capacitors;
  on said secondary side of said transformer, said DC/DC converter comprises:
    said first output capacitor being coupled between a first end of said transformer secondary side and a second end of said transformer secondary side;
    said two pairs of diodes being coupled in parallel to each other;
    said second output capacitor being coupled in parallel with said two pairs of diodes;
    said first end of said transformer secondary side being coupled to a first output coupling point that is between said first pair of diodes;
    said second end of said transformer secondary side being coupled to a second output coupling point that is between said second pair of diodes;

wherein said DC/DC converter further comprises a controller for controlling said circuit element modules and said energy storage sub-circuits, said controller comprising:
- an MPPT controller for implementing maximum power point tracking on said converter and for producing a reference voltage;
- an energy storage controller block for controlling charging and discharging of energy storage components in said energy storage sub-circuits;
- a differential geometric controller for determining a switching frequency and duty cycle for said converter based at least on said reference voltage;
- a differential geometric modulator block for producing gate pulses for power semiconductors in said circuit element modules based on said switching frequency, said duty cycle, and a high frequency current sensed from said transformer.

In a third aspect, the present invention provides a current driven DC/DC converter comprising:
- a transformer having a primary side and a secondary side, said primary side of said transformer receiving an input current, said secondary side of said transformer producing an output current;
- a plurality of pairs of circuit element modules, each of said circuit element modules comprising a semiconductor;
- a plurality of energy storage sub-circuits, each energy storage sub-circuit being associated with a specific pair of circuit element modules;
- an input capacitor;
- an input inductor;
- two pairs of diodes, each pair of diodes being coupled in series;
- a first output capacitor and a second output capacitor;

wherein
  each of said plurality of circuit element modules is coupled in series to other circuit element modules to form a first chain of circuit element modules and a second chain of circuit element modules, said first chain being coupled in parallel with said second chain;
  for both of said first chain and said second chain, each energy storage sub-circuit is coupled between a first coupling point and a second coupling point in said first or second chain of circuit element modules and each energy storage subcircuit and each pair of circuit element modules are arranged in said first chain or said second chain such that for each specific energy storage subcircuit, a specific pair of circuit element modules associated with said specific energy storage subcircuit is coupled in said first chain or said second chain between a specific first coupling point and a specific second coupling point between which said specific energy storage sub-circuit is coupled;

wherein on said primary side of said transformer, said DC/DC converter comprises:
said first chain of circuit element modules and said second chain of circuit element modules;
said input capacitor being coupled in parallel with both of said first chain and said second chain;
said input inductor being coupled between a first end of said transformer primary side and a first coupling point that is in a middle of said first chain;
a second end of said transformer primary side being coupled to a second coupling point that is in a middle of said second chain;

on said secondary side of said transformer, said DC/DC converter comprises:
said two pairs of diodes;
said first output capacitor and said second output capacitor;
said first output capacitor being coupled between a first end of said transformer secondary side and a second end of said transformer secondary side;
said second output capacitor being coupled in parallel with said two pairs of diodes;
said first end of said transformer secondary side being coupled to a first output coupling point that is between said first pair of diodes;
said second end of said transformer secondary side being coupled to a second output coupling point that is between said second pair of diodes;

wherein said DC/DC converter further comprises a controller for controlling said circuit element modules and said energy storage sub-circuits, the controller comprising:
an MPPT controller for implementing maximum power point tracking on said converter and for producing a reference voltage;
an energy storage controller block for controlling charging and discharging of energy storage components in said energy storage sub-circuits;
a differential geometric controller for determining a switching frequency and duty cycle for said converter based at least on said reference voltage;
a differential geometric modulator block for producing gate pulses for power semiconductors in said circuit element modules based on said switching frequency, said duty cycle, and a high frequency current sensed from said transformer.

In a fourth aspect, the present invention provides a DC/DC converter comprising:
a transformer having a primary side and a secondary side, said primary side of said transformer receiving an input current, said secondary side of said transformer producing an output current;
a plurality of pairs of circuit element modules, each of said circuit element modules comprising a semiconductor;
a plurality of energy storage sub-circuits, each energy storage sub-circuit being associated with a specific pair of circuit element modules;
a pair of input capacitors coupled in series to each other;
an input inductor;
a pair of diodes, each pair of diodes being coupled in series;
a pair of output circuit element modules;
a first output capacitor, a second output capacitor, a third output capacitor, and a fourth output capacitor;

wherein each of said plurality of pairs of circuit element modules is coupled in series to other circuit element modules to form a chain of circuit element modules;
each energy storage sub-circuit is coupled between a first coupling point and a second coupling point in said chain of circuit element modules and each energy storage subcircuit and each pair of circuit element modules are arranged in said chain such that for each specific energy storage subcircuit, a specific pair of circuit element modules associated with said specific energy storage subcircuit is coupled in said chain between a specific first coupling point and a specific second coupling point between which said specific energy storage sub-circuit is coupled;

and wherein on said primary side of said transformer, said DC/DC converter comprises:
said pair of input capacitors being coupled in parallel to said chain;
said input inductor is coupled between a first end of said transformer primary side and a first coupling point that is in a middle of said chain;
a second end of said transformer primary side is coupled to a second coupling point that is between said pair of input capacitors;
an input is coupled in parallel to said pair of input capacitors;

on said secondary side of said transformer, said DC/DC converter comprises:
said first output capacitor being coupled between a first end of said transformer secondary side and a second end of said transformer secondary side;
said third output capacitor and said fourth output capacitor being coupled in series;
said pair of output circuit element modules being coupled in series to each other, said pair of output circuit element modules being coupled in parallel to said third and said fourth output capacitors;
said second output capacitor being coupled in parallel with pair of output circuit element modules;
said first end of said transformer secondary side being coupled to a first output coupling point that is between said pair of output circuit element modules;
said second end of said transformer secondary side being coupled to a second output coupling point that is between said third output capacitor and said fourth output capacitor;

wherein said DC/DC converter further comprises a controller for controlling said circuit element modules and said energy storage sub-circuits, said controller comprising:
an MPPT controller for implementing maximum power point tracking on said converter and for producing a reference voltage;
an energy storage controller block for controlling charging and discharging of energy storage components in said energy storage sub-circuits;
a differential geometric controller for determining a switching frequency and duty cycle for said converter based at least on said reference voltage;

a differential geometric modulator block for producing gate pulses for power semiconductors in said circuit element modules based on said switching frequency, said duty cycle, and a high frequency current sensed from said transformer.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
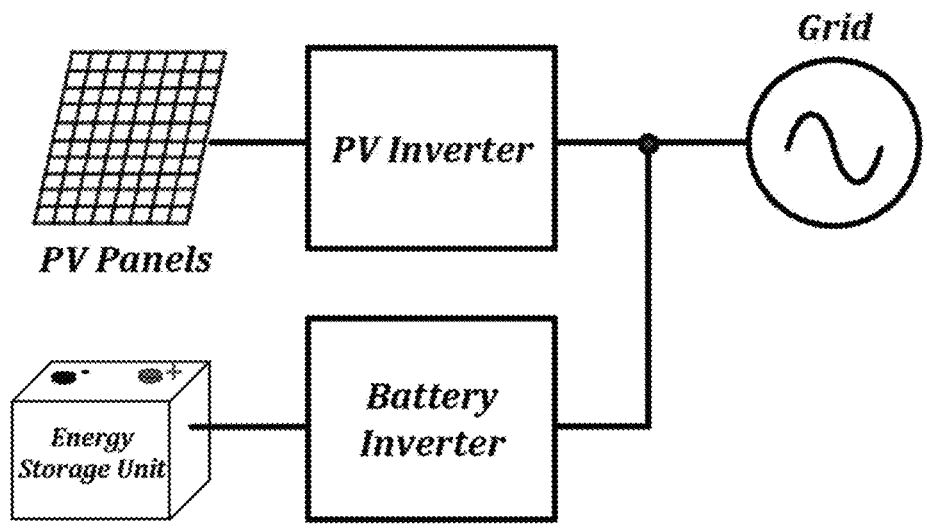
FIGS. 1 to 5 are block diagrams of various configurations of prior art systems which were used to address issues relating to PV panels, their intermittency and reliance on weather conditions.
Figure 2:
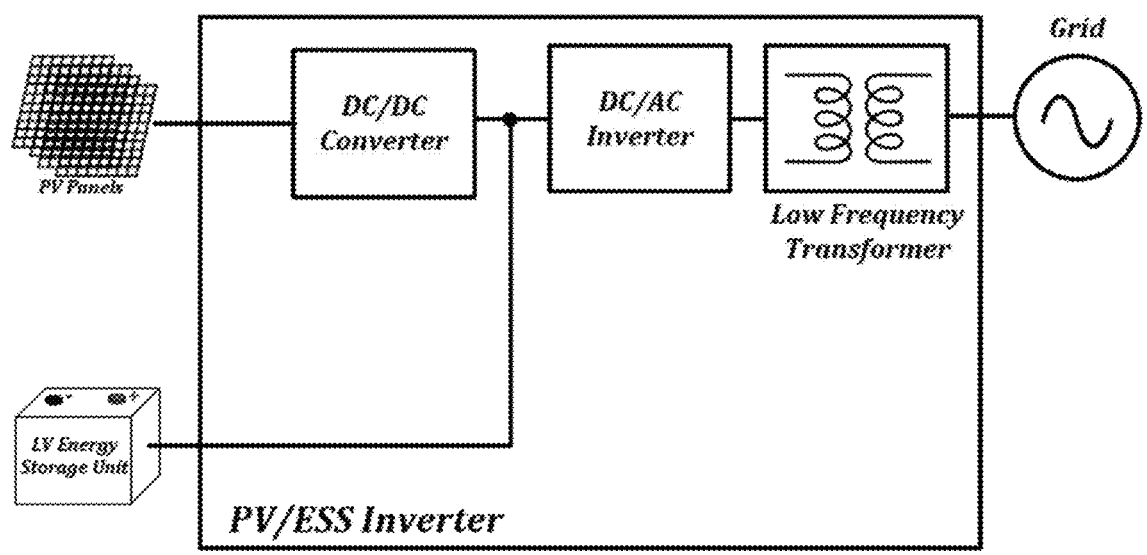
Figure 3:
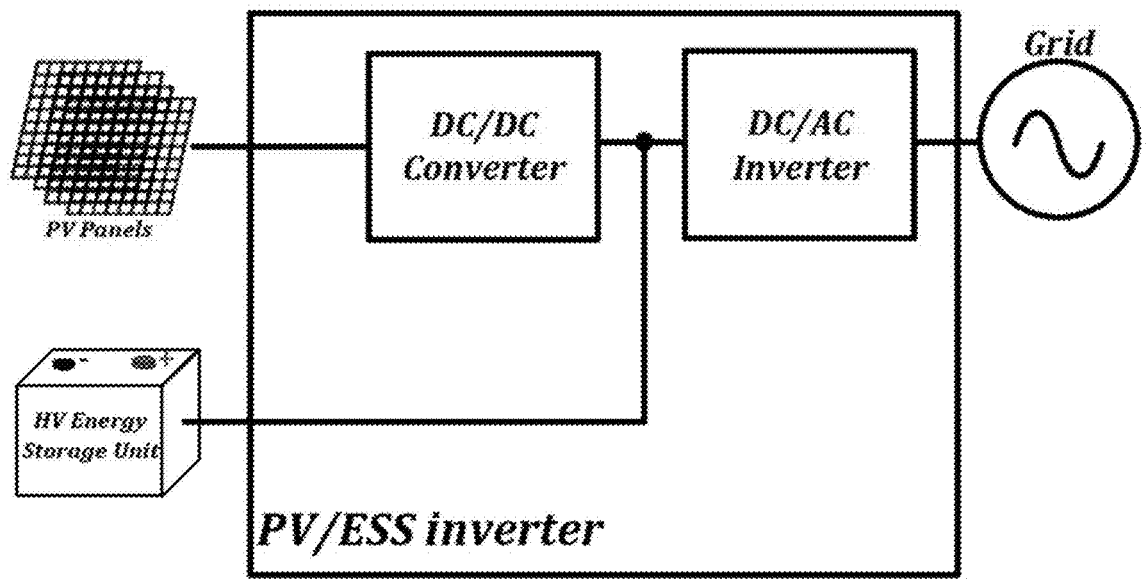
Figure 4:
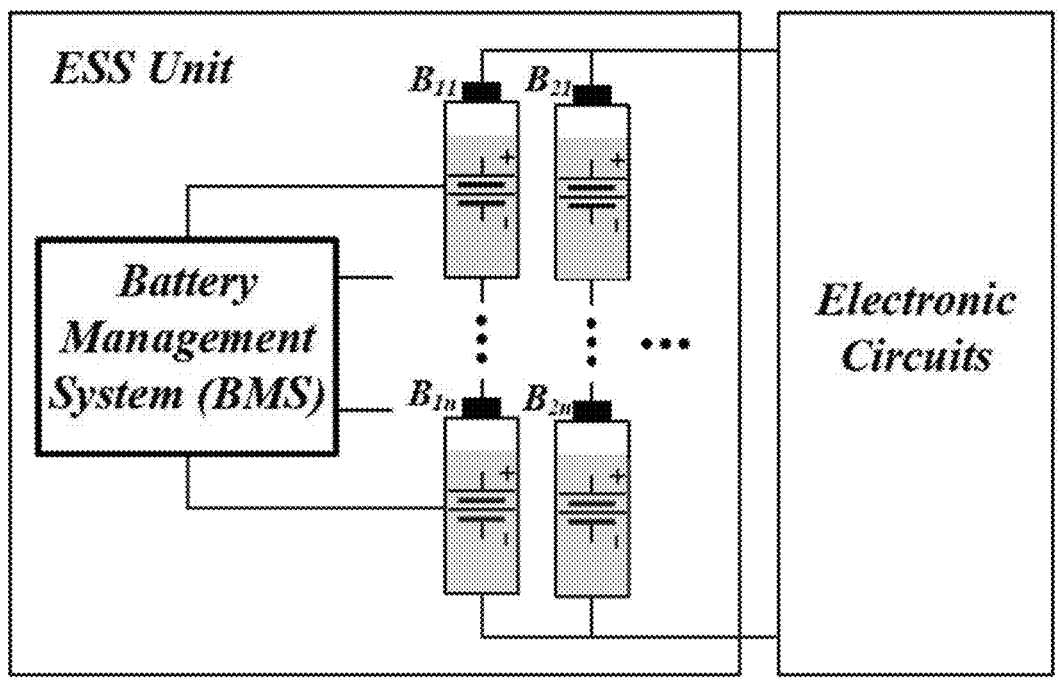
Figure 5:
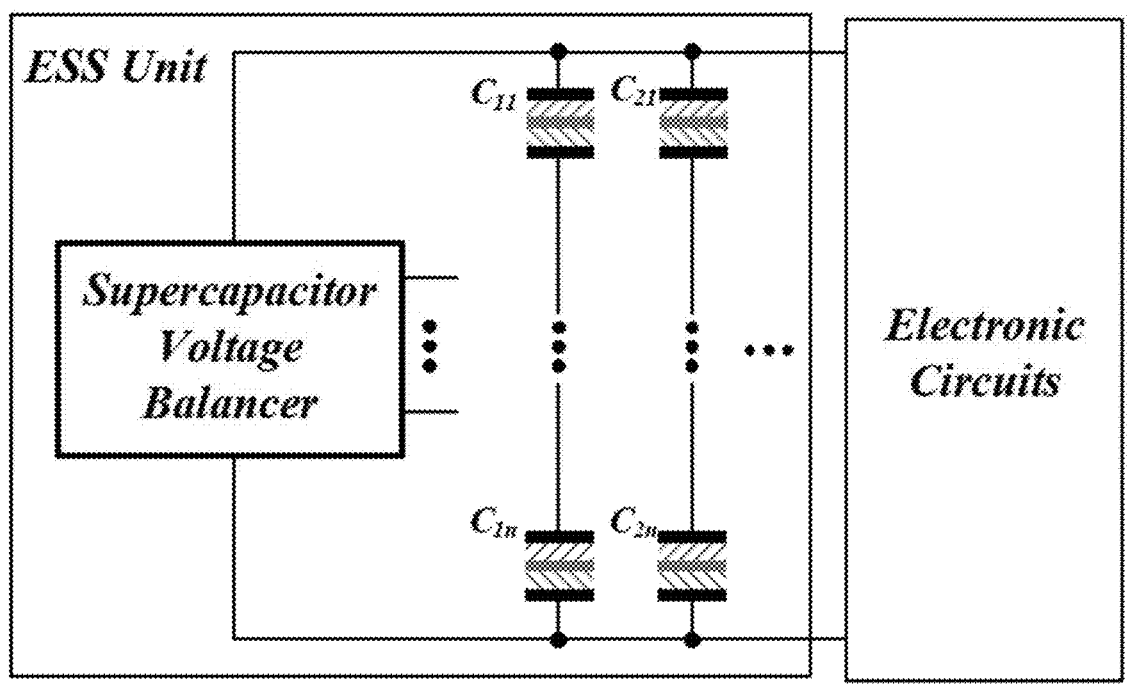
Figure 6:
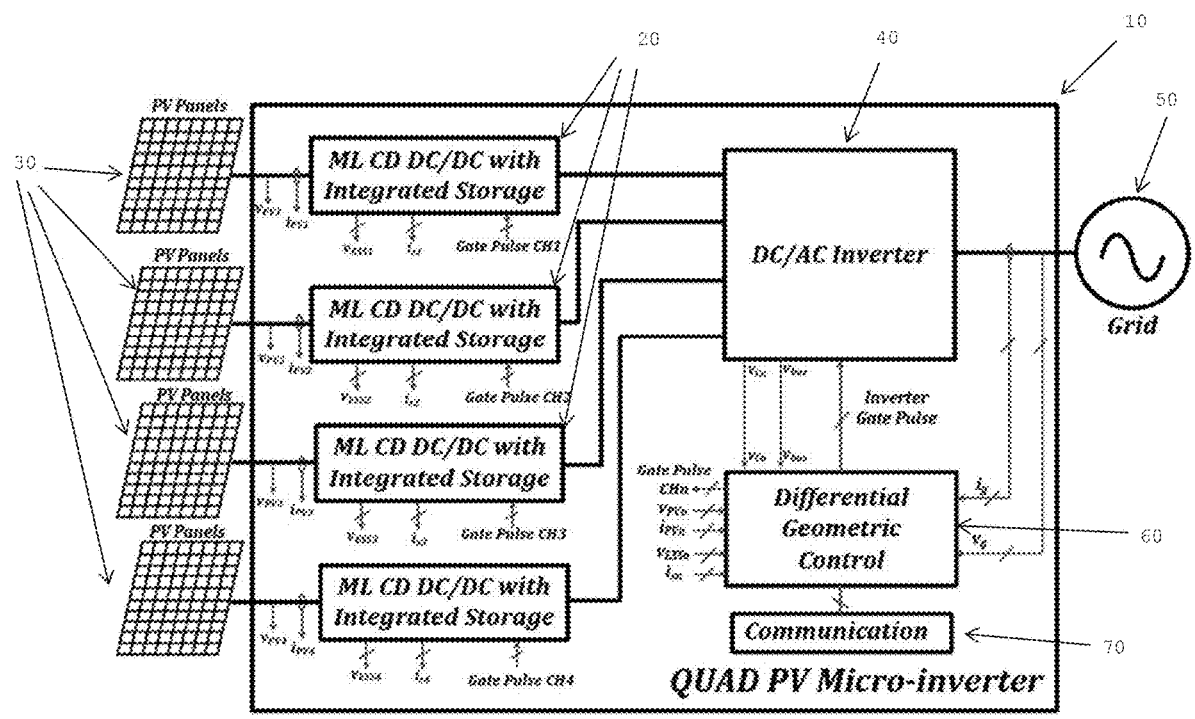
FIG. 6 is a block diagram of a multi-input PV micro-inverter with integrated energy storage.

Referring to FIG. 6, a block diagram of a multi-input PV micro-inverter 10 with integrated energy storage according to one aspect of the present invention is presented. According to this figure, the micro-inverter 10 includes the following blocks:

Multiple Multi-Level (ML) Current-Driven (CD) DC/DC Converter blocks 20 with integrated energy storage, each of which performs maximum power point tracking (MPPT) for each of the individual PV panels 30 at their inputs, and each of which controls the charge-discharge of the energy storage cells in the block. The outputs of these blocks are connected to a high voltage DC bus;

a DC/AC Inverter block 40, which converts the DC power into AC power compatible with the AC grid 50 and/or local loads;

a Differential Geometric Control block 60, which controls both the DC/DC converters and the DC/AC converters in the converter blocks 20 in order to perform certain tasks such as MPPT of the PV panels, charge-discharge control of storage cells, shaping of the AC current at the output of the inverter 40, regulation of the DC bus voltage, etc.; and a communication block 70, which is responsible for connecting the micro-inverter 10 to the outside world by monitoring, importing, and reporting various data from/to the micro-inverter 10.

Figure 7A:
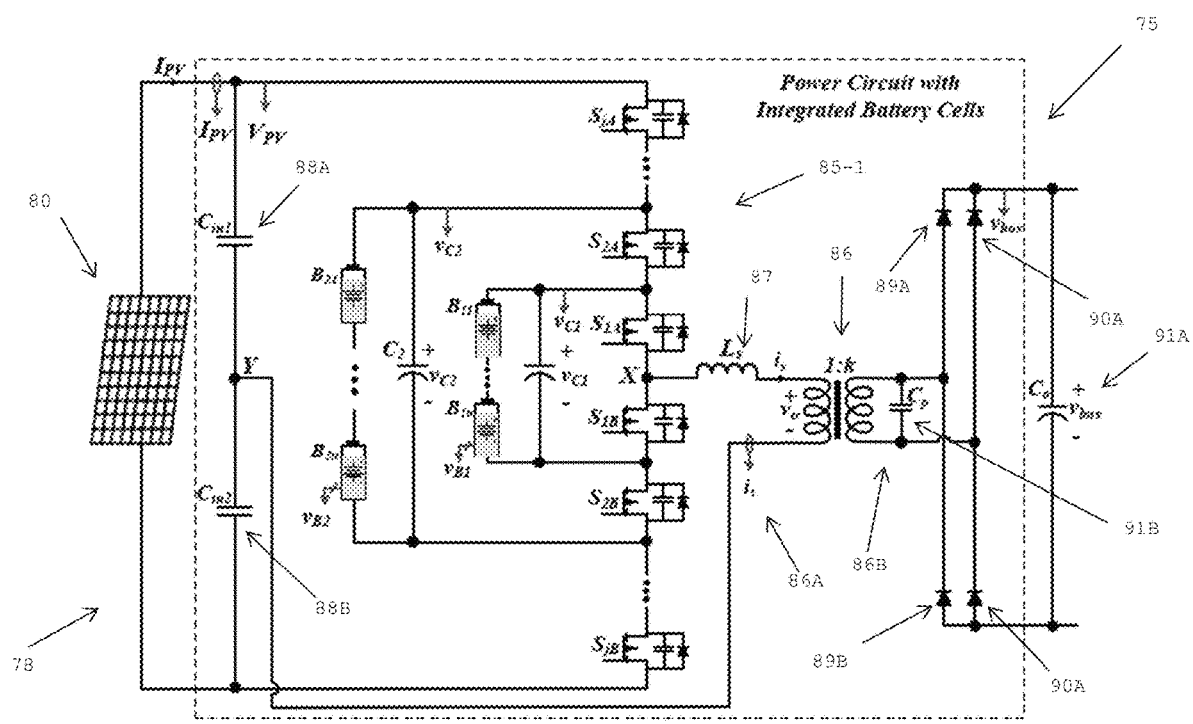
FIG. 7A is a schematic diagram of a multi-level current-driven DC/DC converter with integrated battery cells according to one aspect of the present invention.

Referring to FIG. 7A, the schematic diagram of a Multi-Level (ML) Current-Driven (CD) DC/DC Converter block 75 with integrated battery cells is illustrated. This arrangement is a half-bridge configuration (i.e., it included only one active leg). The ML CD DC/DC converter 75 is responsible for performing MPPT for the attached PV panel 80 and controls the charge-discharge of the integrated battery cells. According to this figure, the ML CD DC/DC converter 75 includes a Power Circuit with Integrated Battery Cells 78, which includes:

an active multi-level leg, which includes the power semiconductors $S_{iA}$ and $S_{iB}$. These semiconductor switches are controlled such that an appropriate high frequency voltage is created across XY, with X and Y being connection points as shown in the figure;

a capacitive voltage divider including capacitors $C_{in1}$, $C_{in2}$, with the voltage divider being responsible for attenuating the voltage ripple across the attached PV panel 80 and also for eliminating any DC current from the high frequency transformer;

battery cells along with the respective capacitors, with the battery cells being responsible for storing energy and releasing that energy when needed;

a series inductance, $L_s$, the parallel capacitance, $C_p$, and the high frequency transformer, the combination of which is responsible for shaping the high frequency current in order to provide an appropriate voltage gain for the DC/DC converter; and a diode rectifier, which is responsible for rectifying the high frequency current/voltage and then converting it to DC power, even though a full-bridge rectifier is used in this configuration, other configurations such as half-bridge diode rectifier, voltage doubler, etc. can also be used.

It should be clear that the various configurations of circuits and arrangements detailed below will use the concept of circuit element modules. Each circuit element module includes a semiconductor, a diode, and a capacitor. For each circuit element module, the diode and capacitor are coupled in parallel with the semiconductor. The control signal for the semiconductor in each circuit element module is to be generated by the digital control system associated with each configuration/arrangement.

As can be seen from FIG. 7A, the converter block 75 includes a number of circuit element modules. As can be seen, most of the circuit element modules are paired with one another. The paired circuit element modules are coupled as a single chain 85-1 in a series configuration with each pair of circuit element modules being associated with a specific string of battery cells, each string of battery cells being multiple battery cells coupled in series. The associated string of battery cells is coupled to be in parallel an associated capacitor. Each string of battery cells, in parallel with its associated capacitor, is also in parallel with the pair of circuit element modules that the string of battery cells is associated with. Thus, each string of battery cells is coupled between a first and a second coupling point on the chain and the pair of circuit element modules that is associated with the string of battery cells is coupled in series (to each other or to other modules) between the first and second coupling points. As can be seen, other circuit element modules may also be between those first and second coupling points. The string of battery cells (and its associated capacitor associated with which each pair of circuit element modules are detailed in the table below:

| Battery cells in the string | Associated capacitor | First circuit element module in the pair | Second circuit element module in the pair |
|---|---|---|---|
| $B_{11}, \ldots, B_{1n}$ | $C_1$ | $S_{1A}$ | $S_{1B}$ |
| $B_{21}, \ldots, B_{2n}$ | $C_2$ | $S_{2A}$ | $S_{2B}$ |

It should be clear from the Figure that other pairs of circuit element modules, with modules $S_{jA}$ and $S_{jB}$, may be at the ends of this chain of modules 85-1.

Referring to FIG. 7A, it can be seen that the converter block 75 includes a transformer 86. The transformer 86 includes a primary side 86A and a secondary side 86B. The primary side 86A includes an input inductor 87, input capacitors 88A, 88B, battery strings (with associated capacitors $C_1$, $C_2$), and a number of circuit element modules. As can be seen, in parallel with the chain 85-1 of circuit element modules are the two input capacitors 88A, 88B coupled in series with each other. Midway along the chain 85-1 of modules is the input inductor 87. The input inductor 87 is coupled between the midpoint of chain 85-1 and one lead of transformer 86. The other lead of transformer 86 is coupled to a coupling point between input capacitors 88A, 88B. As can be seen, the PV panel 80 is coupled in parallel to the series coupled input capacitors 88A, 88B and the chain 85-1.

On the secondary side 86B of the transformer 86, there is a first pair of output diodes 89A, 89B, a second pair of output diodes 90A, 90B, and two output capacitors 91A, 91B. Each of the diodes that make up the first pair of output diodes is coupled in series to each other and the second pair of output diodes is similar coupled in series to each other. Then, the first pair of output diodes is coupled in parallel to the second pair of output diodes while the first output capacitor is coupled in parallel to both pairs of output diodes. The first lead of the secondary side of the transformer is coupled to a coupling point between the first pair of output diodes. The second lead of the secondary side of the transformer is coupled to a coupling point that is between the second pair of output diodes. The second output capacitor is coupled between the first and second leads of the secondary side of the transformer.

Figure 7B:
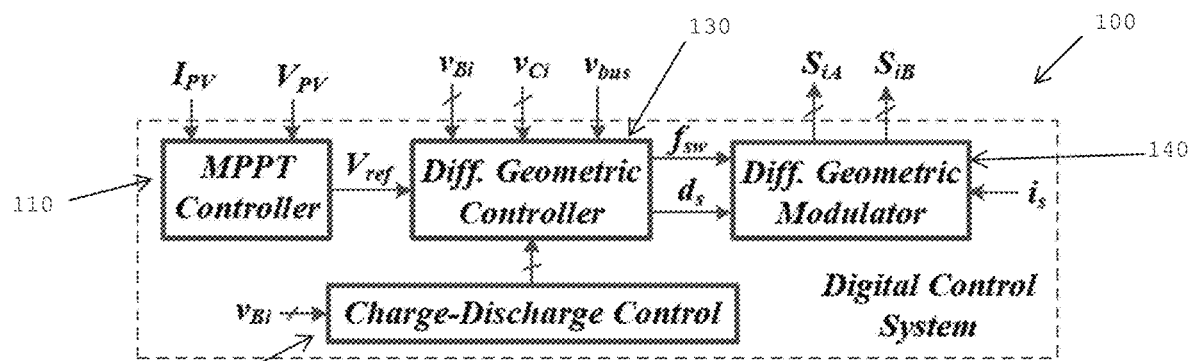
FIG. 7B is a block diagram of a digital control system for controlling the DC/DC converter illustrated in FIG. 7A.

The ML CD DC/DC converter block 75 includes a digital control system 100 as shown in FIG. 7B. This digital control system 100 includes:

- an MPPT Controller 110, which receives the respective PV voltage and current signals and produces the appropriate voltage reference across the PV panel 80;
- a Charge-Discharge Control block 120, which is responsible for controlling the charge and discharge regimes of the battery cells;
- a Differential Geometric Controller block 130, which produces the appropriate switching frequency and duty cycle for the converter 170 based on the voltage reference and other signals from the power circuit and from the Charge-Discharge Control block 120; and
- a Differential Geometric Modulator block 140, which generates the appropriate gate pulses for the power semiconductors based on the calculated switching frequency $f_{sw}$, the duty cycle ds, and the high frequency current $i_s$.

Referring to FIG. 7B, as can be seen, the digital control system 100 includes MPPT controller block 110. The MPPT block 110 receives the current and voltage readings from the PV panel 80. A reference voltage $V_{ref}$ is produced by the MPPT block 110 and this voltage is received by the differential geometric controller 130. In addition to this, the differential geometric controller 130 also receives the voltages ($v_{Ci}$) from the capacitors associated with the string of battery cells, the voltages ($v_{Bi}$) from the battery cells, and the output voltage ($v_{bus}$) of the converter 70. A switching frequency value $f_{sw}$ and a switch duration $d_s$ are produced by the differential geometric controller 130. These values are received by the differential geometric modulator block 140. The differential geometric block 140 also receives the current from the primary side of the transformer 120. The differential geometric block 140 then produces the switching pulses ($S_{iA}$, $S_{iB}$) that control the power semiconductors in the power circuit. It should also be clear that the charge-discharge control block 120 also receives the voltages ($v_{Bi}$) from the battery cells and passes its output to the differential geometric controller 130.

Figure 8B:
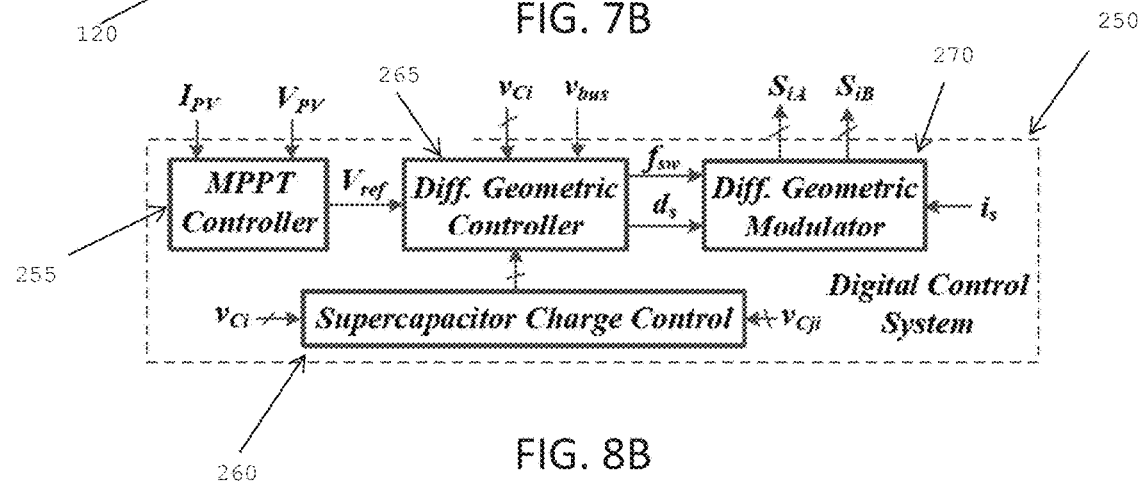
FIG. 8B is a block diagram of a digital control system for controlling the DC/DC converter illustrated in FIG. 8A.
Figure 8A:
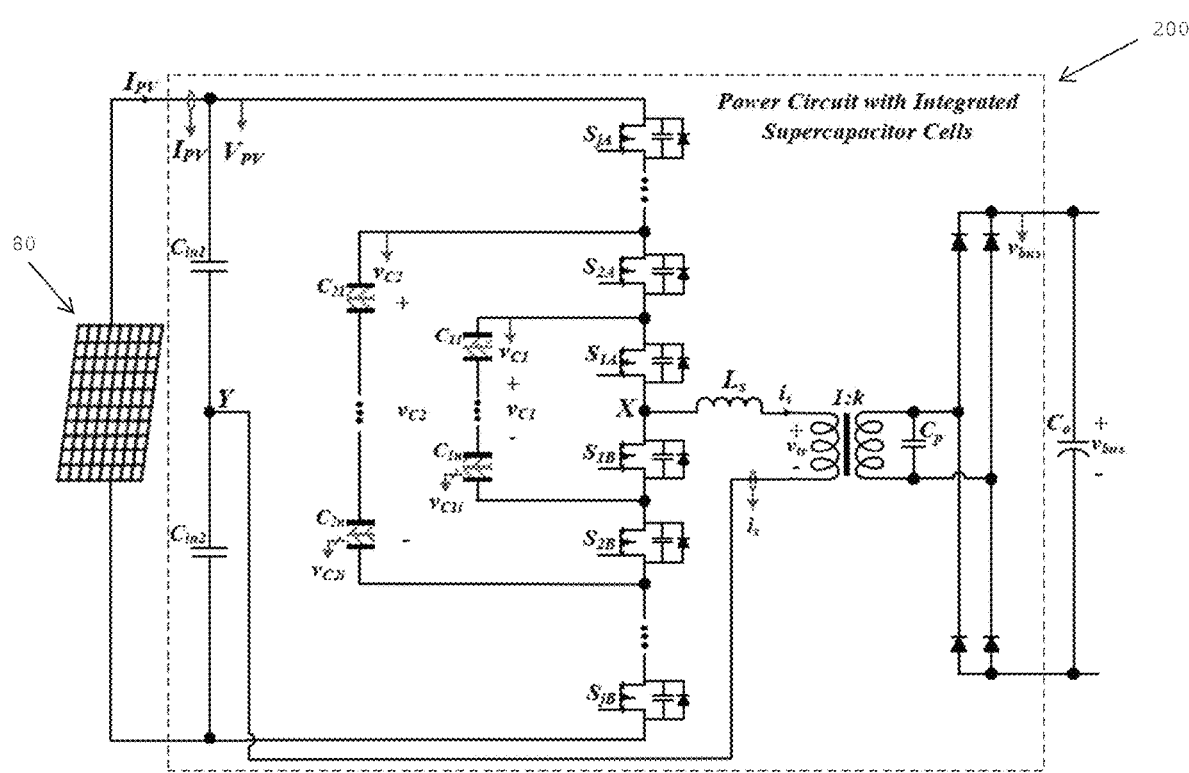
FIG. 8A is a schematic diagram of a multi-level current-driven DC/DC converter with integrated supercapacitor cells according to another aspect of the present invention.

Referring to FIG. 8A, a schematic diagram of a Multi-Level (ML) Current-Driven (CD) DC/DC Converter 200 with integrated supercapacitor cells according to one aspect of the present invention is illustrated. This arrangement is a half-bridge configuration in that the configuration includes only one active leg. The ML CD DC/DC converter 200 is responsible for performing MPPT for the attached PV panel 80 and for controlling the charge-discharge of the integrated supercapacitor cells. As can be seen from FIG. 8A, the ML CD DC/DC converter 200 includes a power circuit with integrated supercapacitor cells and this power circuit includes:

- an active multi-level leg, which includes the power semiconductors $S_{iA}$ and $S_{iB}$. These semiconductor switches are controlled such that an appropriate high frequency voltage is created across XY, with X and Y being connection points as shown in FIG. 8A;
- a capacitive voltage divider that uses capacitors $C_{in1}$, $C_{in2}$, with the voltage divider attenuating the voltage ripple across the attached PV panel 80 and with the voltage divider also eliminating any DC current from the high frequency transformer that forms part of the converter 200;

supercapacitor cells, which store energy and which release the energy when needed;

a series inductance $L_s$, a parallel capacitance $C_p$, and a high frequency transformer, with these components shaping the high frequency current to thereby provide an appropriate voltage gain for the DC/DC converter 200;

a diode rectifier that is for rectifying the high frequency current/voltage and for convert the current/voltage to DC power and, even though a full-bridge rectifier is used in this configuration, other configurations (such as half-bridge diode rectifier, voltage doubler, etc.) can also be used.

It should be clear from FIG. 8A that the power circuit illustrated is identical to the power circuit shown in FIG. 7A with the difference that, instead of multiple strings of battery cells, with each string having an associated capacitor, the power circuit in FIG. 8A uses strings of supercapacitor cells. Each string of supercapacitor cells, unlike the strings of battery cells, do not have an associated capacitor. In the circuit in FIG. 7A, for each string of battery cells, capacitor voltage is taken across the associated capacitor. For the circuit in FIG. 8A, capacitor voltage is taken across each string of capacitors. As such, capacitor voltage $v_{c1}$ is taken across the string of capacitors $c_{11} \ldots C_{1n}$. Similarly, capacitor voltage $v_{c2}$ is taken across the strong of capacitors $c_{21} \ldots C_{2n}$. For greater clarity, the table below details which supercapacitor cells are associated with which circuit element module pairs:

| Supercapacitor cells in the string | First circuit element module in the pair | Second circuit element module in the pair |
|---|---|---|
| $C_{11}, \ldots, C_{1n}$ | $S_{1A}$ | $S_{1B}$ |
| $C_{21}, \ldots, C_{2n}$ | $S_{2A}$ | $S_{2B}$ |

Referring to FIG. 8B, illustrated is a digital control system 250 that controls the ML CD DC/DC converter 200. The digital control system 250 includes:

an MPPT controller 255 which receives the PV voltage and current signals and produces an appropriate voltage reference across the attached PV panel 80;

a supercapacitor charge control block 260 that controls the charge of the supercapacitor cells;

a Differential Geometric Controller block 265 which produces the appropriate switching frequency and duty cycle for the converter 200 based on the voltage reference and other signals from the power circuit and from the supercapacitor charge control block 260;

a differential geometric modulator block 270 that generates the appropriate gate pulses for the power semiconductors based on the calculated switching frequency $f_{sw}$, the duty cycle ds, and the high frequency current is.

Referring to FIG. 8B, the digital control system has similar blocks and similar functions to the digital control system in FIG. 7B. However, instead of a charge-discharge control block to control battery cells, the digital control system in FIG. 8B has a supercapacitor charge control block 260 that receives the voltage across each supercapacitor string ($v_{Ci}$) and the voltage across each supercapacitor cell ($v_{Cji}$).

Figure 9A:
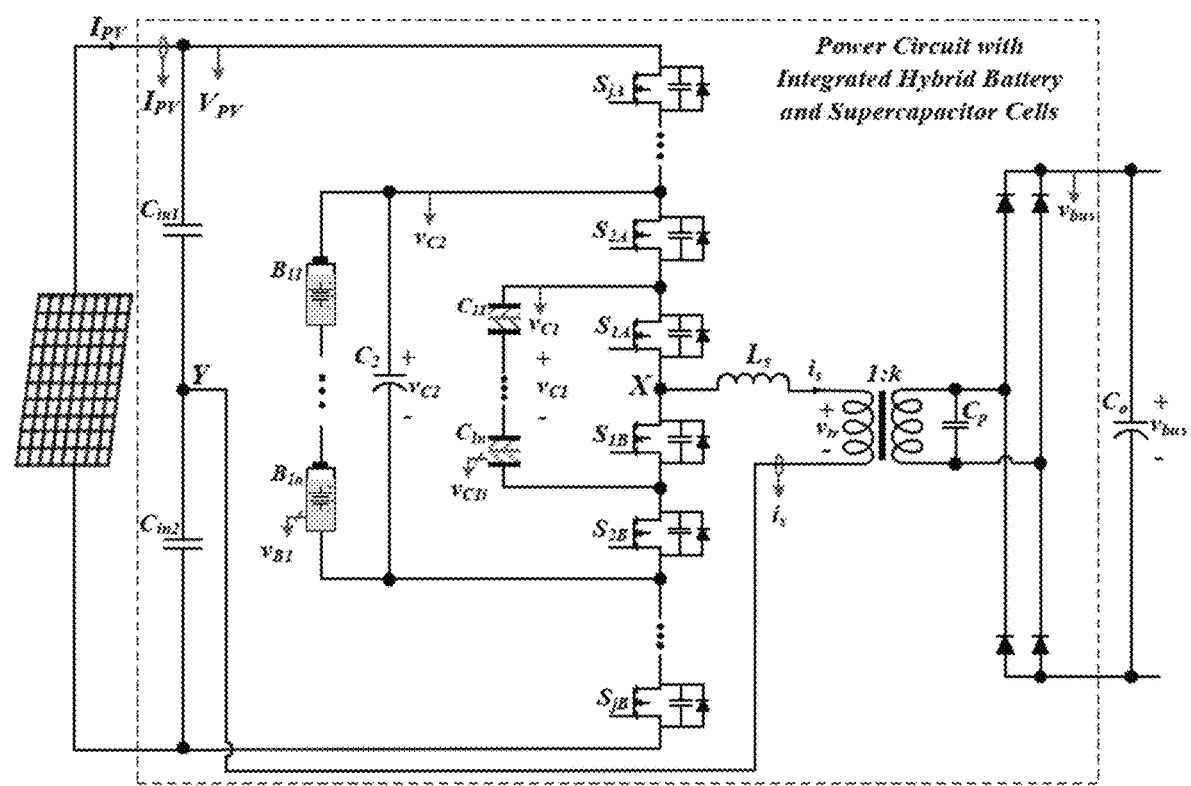
FIG. 9A is a schematic diagram of a multi-level current-driven half-bridge DC/DC converter with integrated hybrid battery and supercapacitor cells according to another aspect of the present invention.

Referring to FIG. 9A, a schematic diagram for a Multi-Level Current-Driven Half-Bridge DC/DC Converter 300 with Integrated Hybrid Battery and Supercapacitor Cells is shown. As can be seen from FIG. 9A, the arrangement is similar to that in FIG. 8A and FIG. 7A but, instead of only using battery cells or only supercapacitor cells, both types of energy storage units are used. As can be seen, supercapacitor cells are used for the first pair of circuit element modules while battery cells are used for the second pair of circuit element modules. In this arrangement the supercapacitor cells can be used for short-term fast power transfer and battery cells can be used for long-term slow power supply/storage. For greater clarity, the table below details which strings of supercapacitor cells and which strings of battery cells are associated with which pair of circuit element modules.

| Battery cells in the string | Supercapacitor cells in the string | First circuit element module in the pair | Second circuit element module in the pair |
|---|---|---|---|
| NONE | $C_{11}, \ldots, C_{1n}$ | $S_{1A}$ | $S_{1B}$ |
| $B_{11}, \ldots, B_{1n}$ | NONE | $S_{2A}$ | $S_{2B}$ |

It should be clear that any combination of supercapacitor cells and battery cells may be used in the circuit of FIG. 9A.

Figure 9B:
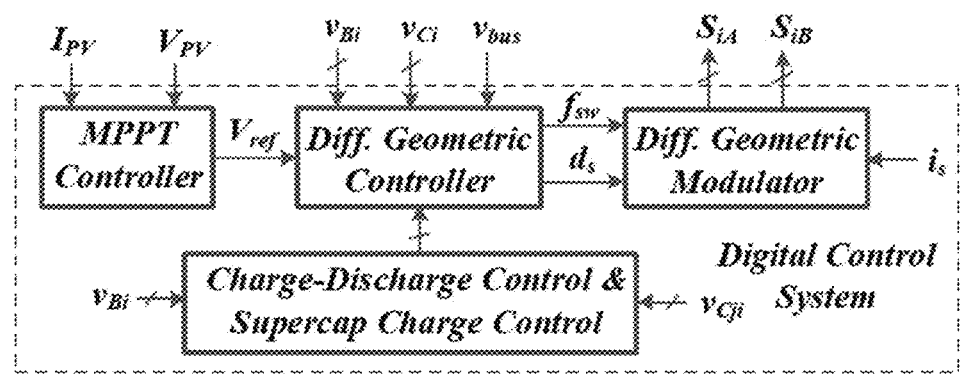
FIG. 9B is a block diagram of a digital control system for controlling the DC/DC converter illustrated in FIG. 9A.

Referring to FIG. 9B, illustrated is a digital control system for controlling the Multi-Level Current-Driven Half-Bridge DC/DC Converter 300 with Integrated Hybrid Battery and Supercapacitor Cells. As can be seen, this digital control system is the same as the digital control system shown in FIG. 8B but, instead of a supercapacitor charge control block, this digital control system has a charge-discharge control and supercapacitor charge control block. This block thus controls the charge of the supercapacitors as well as the charge-discharge cycles of the battery cells. As can be seen, the charge-discharge control and supercapacitor charge control block receives the voltage across each battery cell and across each supercapacitor cell.

Figure 10B:
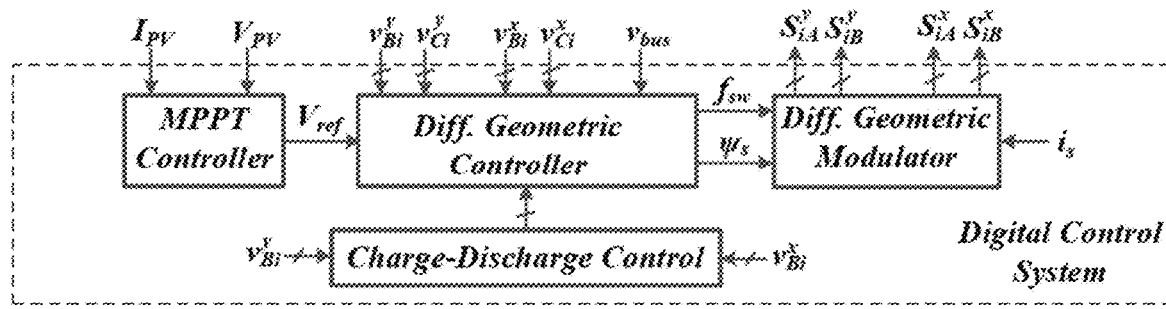
FIG. 10B is a block diagram of a digital control system for controlling the DC/DC converter illustrated in FIG. 10A.
Figure 10A:
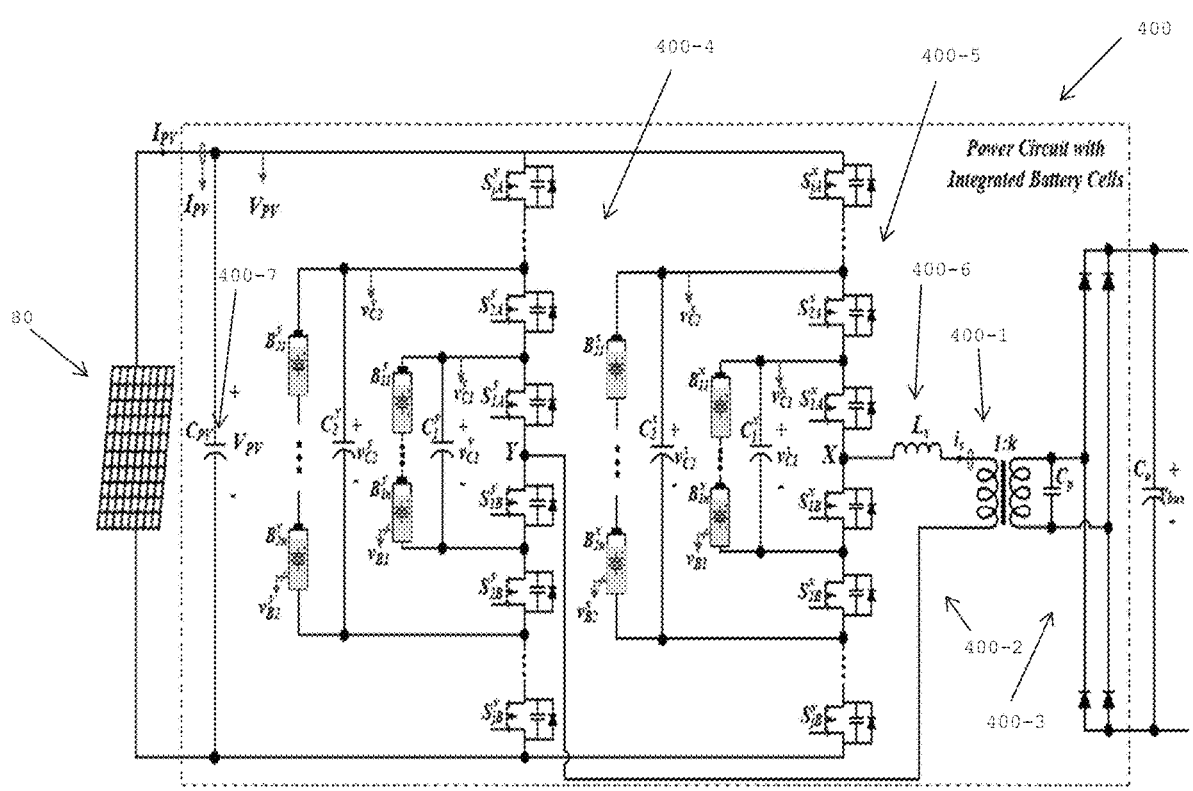
FIG. 10A is a schematic diagram of a multi-level current-driven full-bridge DC/DC converter with integrated battery cells according to another aspect of the present invention.

Referring to FIG. 10A, a schematic diagram of a Multi-Level (ML) Current-Driven (CD) DC/DC Converter 400 with Integrated Battery Cells is illustrated. This arrangement is a full-bridge configuration in that it includes two active legs. The ML CD DC/DC converter 400 performs MPPT for the attached PV panel 80 and controls the charge-discharge of the integrated battery cells. As can be seen from FIG. 10A, the ML CD DC/DC converter 400 includes a power circuit with integrated battery cells, which includes:

two active multi-level legs, which include the power semiconductors $S_{iA}$ and $S_{iB}$ and the power semiconductors $S_{iA}$ and $S_{iB}$. These semiconductor switches are controlled such that an appropriate high frequency voltage is created across XY, with X and Y being connection points as shown in FIG. 10A;

battery cells along with the respective capacitors, with each battery cell string and associated capacitor storing energy and release that energy when needed;

a series inductance $L_s$, a parallel capacitance $C_p$, and a high frequency transformer, the combination of which is responsible for shaping the high frequency current in order to provide the appropriate voltage gain for the DC/DC converter 400;

a diode rectifier, which is responsible for rectifying the high frequency current/voltage and convert it to DC power, even though a full-bridge rectifier is used in this configuration, other configurations such as half-bridge diode rectifier, voltage doubler, etc. can also be used.

Referring to FIG. 10A, the power circuit 400 includes a transformer 400-1 that has a primary side 400-2 and a secondary side 400-3. On the primary side 400-2 of the transformer 400-1, it can be seen that, instead of a single chain of circuit element modules, there are two chains 400-4, 400-5. Each chain of circuit element modules has a single chain of series coupled circuit element modules, with each circuit element module being paired with another circuit element module. For each pair of paired circuit element modules, there is associated a specific string of battery cells and each specific string of battery cells is coupled in parallel an associated capacitor and, in turn, to its associated pair of modules. Thus, each string of battery cells is coupled in parallel to an associated capacitor and each associated capacitor and its associated string of battery cells is coupled between a first and a second coupling point on the chain. The pair of circuit element modules that is associated with that string of battery cells is coupled in series (to each other or to other modules) between the first and second coupling points. As can be seen, other circuit element modules may also be between those first and second coupling points. The string of battery modules associated with which each pair of circuit element modules on the first chain of modules 402 (the chain of modules on the left) are detailed in the table below:

| Battery cells in the string | Associated capacitor | First circuit element module in the pair | Second circuit element module in the pair |
|---|---|---|---|
| $B^y_{11}, \ldots, B^y_{1n}$ | $C^y_1$ | $S^y_{1A}$ | $S^y_{1B}$ |
| $B^y_{21}, \ldots, B^y_{2n}$ | $C^y_2$ | $S^y_{2A}$ | $S^y_{2B}$ |

It should be clear from the Figure that multiple other strings of battery cells, associated with modules $S^y_{jA}$ and $S^y_{jB}$, may be at the ends of this first chain 400-4 of modules.

For the second chain of modules 400-5 (the chain of modules on the right), the flying capacitors associated with which each pair of circuit element modules are detailed in the table below:

| Battery cells in the string | Associated capacitor | First circuit element module in the pair | Second circuit element module in the pair |
|---|---|---|---|
| $B^x_{11}, \ldots, B^x_{1n}$ | $C^x_1$ | $S^x_{1A}$ | $S^x_{1B}$ |
| $B^x_{21}, \ldots, B^x_{2n}$ | $C^x_2$ | $S^x_{2A}$ | $S^x_{2B}$ |

It should be clear from the Figure that multiple other strings of battery cells, associated with modules $S^x_{jA}$ and $S^x_{jB}$, may be at the ends of this second chain 400-5 of modules.

Also on the primary side 400-2 of the transformer 400-1 are input inductor 400-6 and input capacitor 400-7. The input inductor 400-6 is coupled between a midpoint of the second chain of modules 400-5 and one lead from the primary side of transformer 400-1. The other lead from the primary side of transformer 400-1 is coupled to a midpoint of the first chain of modules 400-4. The input capacitor 400-7 is coupled in parallel to the two chains of modules 400-4, 400-5. This input capacitor 400-7 is also coupled in parallel to the PV panel 80.

On the secondary side 400-3 of the transformer 400, the configuration is the same as that for the secondary side in the power circuit of FIG. 7A. There is a first pair of output diodes 89A, 89B, a second pair of output diodes 90A, 90B, and two output capacitors 91A, 91B. Each of the diodes that make up the first pair of output diodes is coupled in series to each other and the second pair of output diodes is similar coupled in series to each other. Then, the first pair of output diodes is coupled in parallel to the second pair of output diodes while the first output capacitor 91A is coupled in parallel to both pairs of output diodes. The first lead of the secondary side 400-3 of the transformer 400-1 is coupled to a coupling point between the first pair of output diodes. The second lead of the secondary side of the transformer is coupled to a coupling point that is between the second pair of output diodes. The second output capacitor 91B is coupled between the first and second leads of the secondary side 400-3 of the transformer 400.

Referring to FIG. 10B, illustrated is a digital control system for controlling the ML CD DC/DC converter 400. The digital control system includes the following blocks:
an MPPT Controller that receives PV voltage and current signals and produces an appropriate voltage reference across the attached PV panel;
a Charge-Discharge Control block that controls the charge and discharge regimes of the battery cells;
a Differential Geometric Controller block that produces the appropriate switching frequency and duty cycle for the converter 400 based on the voltage reference and other signals from the power circuit and the Charge-Discharge Control block;
a Differential Geometric Modulator block that generates the appropriate gate pulses for the power semiconductors based on the calculated switching frequency $f_{sw}$, the phase-shift $\psi_s$, and the high frequency current, $i_s$.

As can be seen from FIG. 10B, the digital control system for converter 400 is very similar to the digital control system illustrated in FIG. 7B. As can be imagined, one major difference is that more control signals are generated by the digital control system in FIG. 10B than by the control system in FIG. 7B and the differential geometric controller receives more input signals from the power circuit. It can be seen that the differential geometric controller block receives all the voltages for each of the individual battery cells and for each of the individual associated capacitors. As well, the voltage across each of the different individual battery cells is received by the charge-discharge control block. As well, it can be seen that the digital control system in FIG. 10B uses a phase shift control signal while the digital control system in FIG. 7B uses a duty cycle control signal. Conceptually, however, the two digital control systems are similar.

Figure 11A:
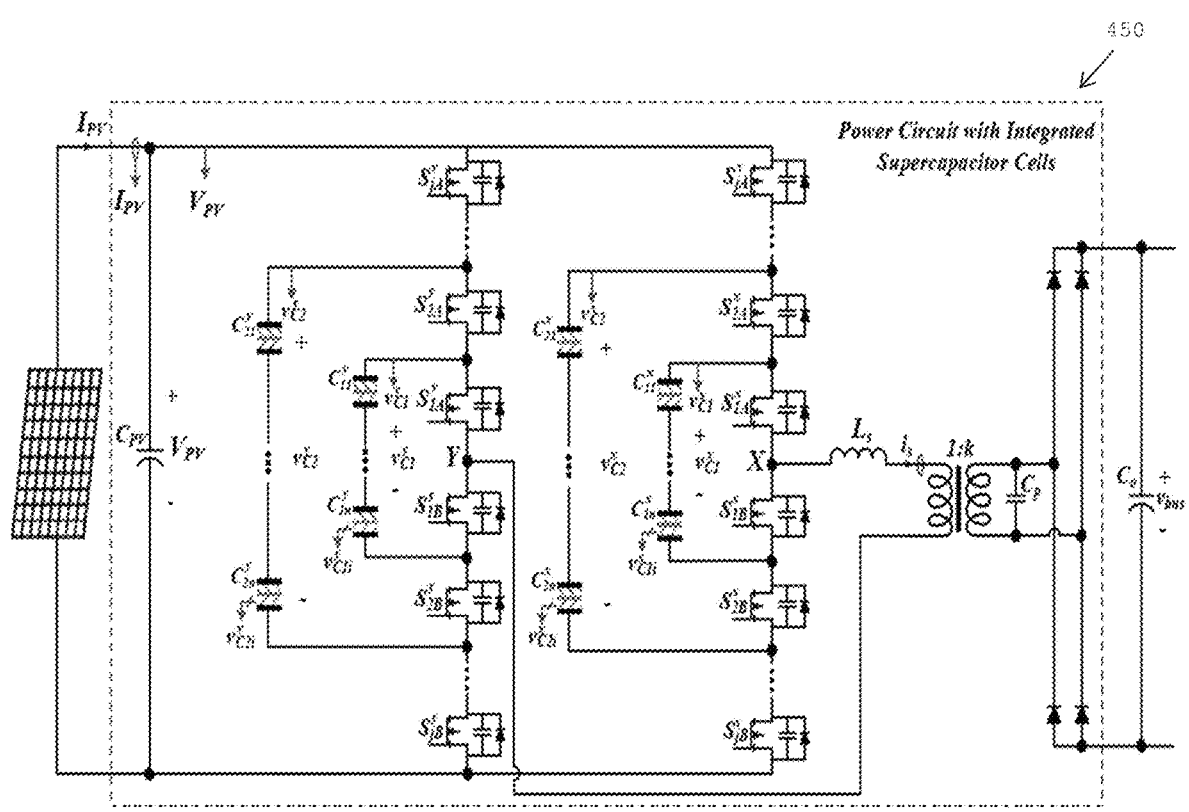
FIG. 11A is a schematic diagram of a multi-level current-driven full-bridge DC/DC converter with integrated supercapacitor cells according to another aspect of the present invention.

Referring to FIG. 11A, a schematic diagram of a Multi-Level (ML) Current-Driven (CD) DC/DC Converter 450 with Integrated Supercapacitor Cells is illustrated. This arrangement is a full-bridge configuration in that it includes two active legs. The ML CD DC/DC converter 450 is responsible for performing MPPT for the attached PV panel 80 and controls the charge-discharge of the integrated supercapacitor cells. As can be seen from FIG. 11A, the ML CD DC/DC converter includes a power circuit with integrated supercapacitor cells and the power circuit includes:
two active multi-level legs, which include the power semiconductors $S^x_{jA}$ and $S^x_{jB}$ and the power semiconductors $S^y_{jA}$ and $S^y_{jB}$. These semiconductor switches are controlled such that an appropriate high frequency voltage is created across XY with X and Y being connection points as illustrated in FIG. 11A;

supercapacitor cells along with the respective capacitors, with the cells storing energy and releasing that energy when needed;

a series inductance $L_s$, a parallel capacitance $C_p$, and a high frequency transformer, the combination of which is responsible for shaping the high frequency current to thereby provide the appropriate voltage gain for the DC/DC converter 450;

a diode rectifier, which is responsible for rectifying the high frequency current/voltage and convert the current/voltage into DC power and, even though a full-bridge rectifier is used in this configuration, other configurations such as half-bridge diode rectifier, voltage doubler, etc. can also be used.

As can be seen from FIG. 11A, this power circuit is very similar to the power circuit in FIG. 10A, with the difference that, in FIG. 10A, a string of battery cells in parallel with a capacitor is coupled between each pair of associated circuit element modules. However, in FIG. 11A, a string of supercapacitor cells is coupled between each pair of associated circuit modules. Other than this difference, the power circuits in FIG. 10A and FIG. 11A are identical.

Figure 11B:
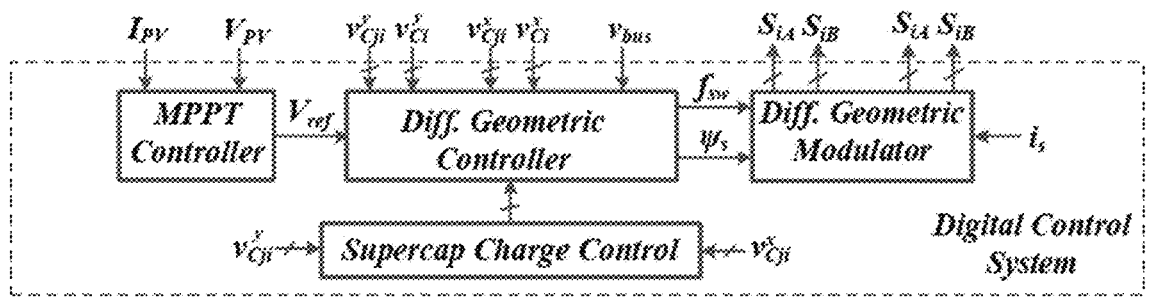
FIG. 11B is a block diagram of a digital control system for controlling the DC/DC converter illustrated in FIG. 11A.

The ML CD DC/DC converter 450 includes a digital control system as illustrated in the schematic diagram of FIG. 11B. This digital control system includes:

an MPPT Controller that receives PV voltage and current signals and produces an appropriate voltage reference across the attached PV panel;

a supercapacitor charge control block that controls the charge and discharge regimes of the supercapacitor cells;

a Differential Geometric Controller block that produces the appropriate switching frequency and duty cycle for the converter 450 based on the voltage reference and other signals from the power circuit and the supercapacitor charge control block;

a Differential Geometric Modulator block that generates the appropriate gate pulses for the power semiconductors based on the calculated switching frequency $f_{sw}$, the phase-shift $\psi_s$, and the high frequency current, $i_s$.

As can be seen from FIG. 11B, the digital control system for converter 450 is very similar to the digital control system illustrated in FIG. 10B. The main difference between these two digital control systems is that the digital control system in FIG. 10B uses a charge-discharge control block while the digital control system in FIG. 11B uses a supercapacitor charge control block. The supercapacitor charge control block receives the voltages across each of the individual supercapacitor cells. Aside from this block, the functions and components and blocks of the two digital control systems are similar.

Figure 12B:
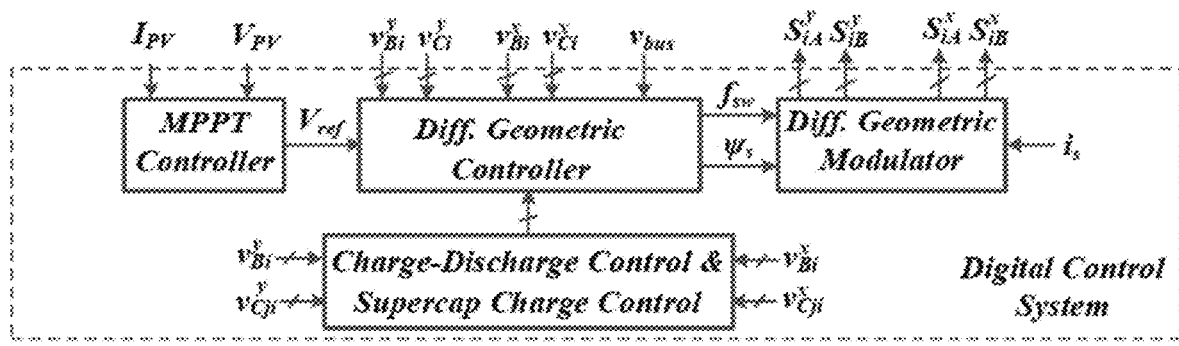
FIG. 12B is a block diagram of a digital control system for controlling the DC/DC converter illustrated in FIG. 12A.
Figure 12A:
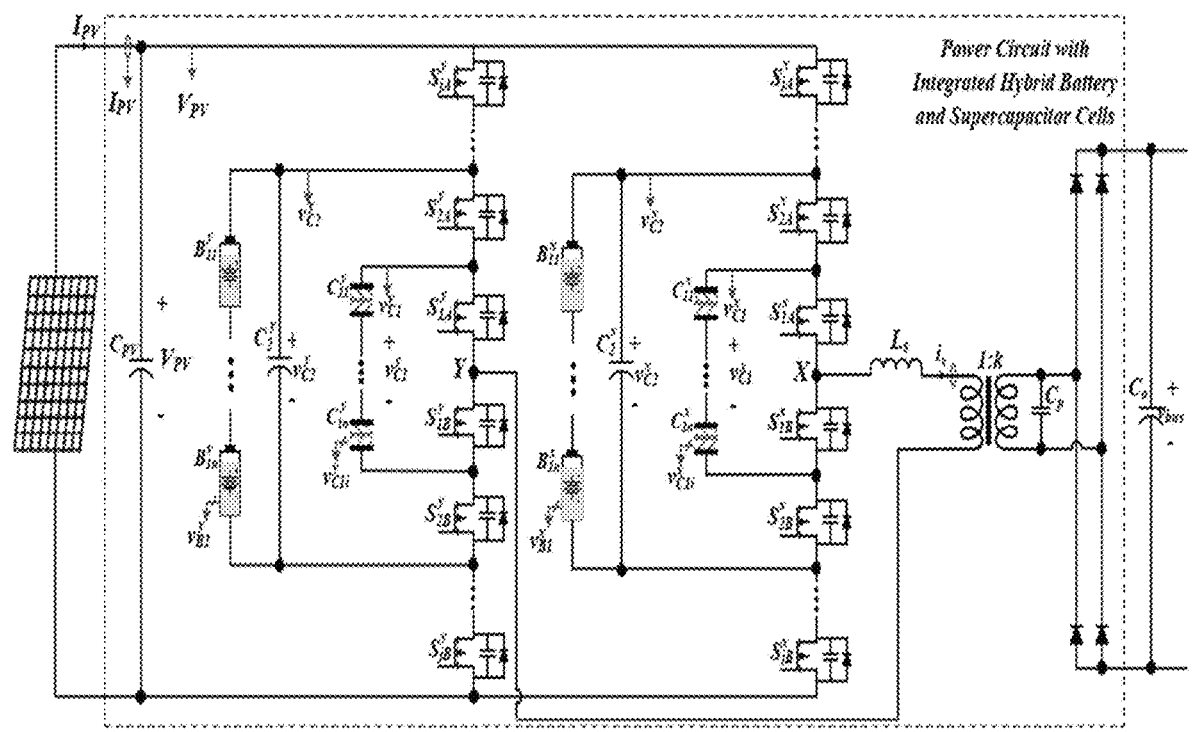
FIG. 12A is a schematic diagram of a multi-level current-driven full-bridge DC/DC converter with integrated hybrid battery and supercapacitor cells according to another aspect of the present invention.

Referring to FIG. 12A, illustrated is a schematic of a Multi-Level Current-Driven Full-Bridge DC/DC Converter with Integrated Hybrid Battery and Supercapacitor Cells. In this arrangement the supercapacitor cells can be used for short-term fast power transfer while battery cells can be used for long-term slow power supply/storage. As can be seen from FIG. 12A, the circuit is similar to the circuit illustrated in FIG. 11A with the difference that in FIG. 12A, strings of battery cells are used in place of some of the strings of supercapacitor cells in FIG. 11A.

Referring to FIG. 12B, illustrated is a digital control system for controlling the circuit shown in FIG. 12A. As can be seen, this digital control system is identical to the digital control system shown in FIG. 11B with the difference that, instead of a supercapacitor charge control block, there is a charge-discharge control and supercapacitor charge control block. This combined block controls the charge-discharge of the battery cells as well as the charge-discharge of the supercapacitor cells.

For clarity, any of the converter configurations detailed in FIGS. 7A, 8A, 9A, 10A, 11A, and 12A (along with their associated digital control systems) can be used with the inverter system of FIG. 6.

Figure 13:
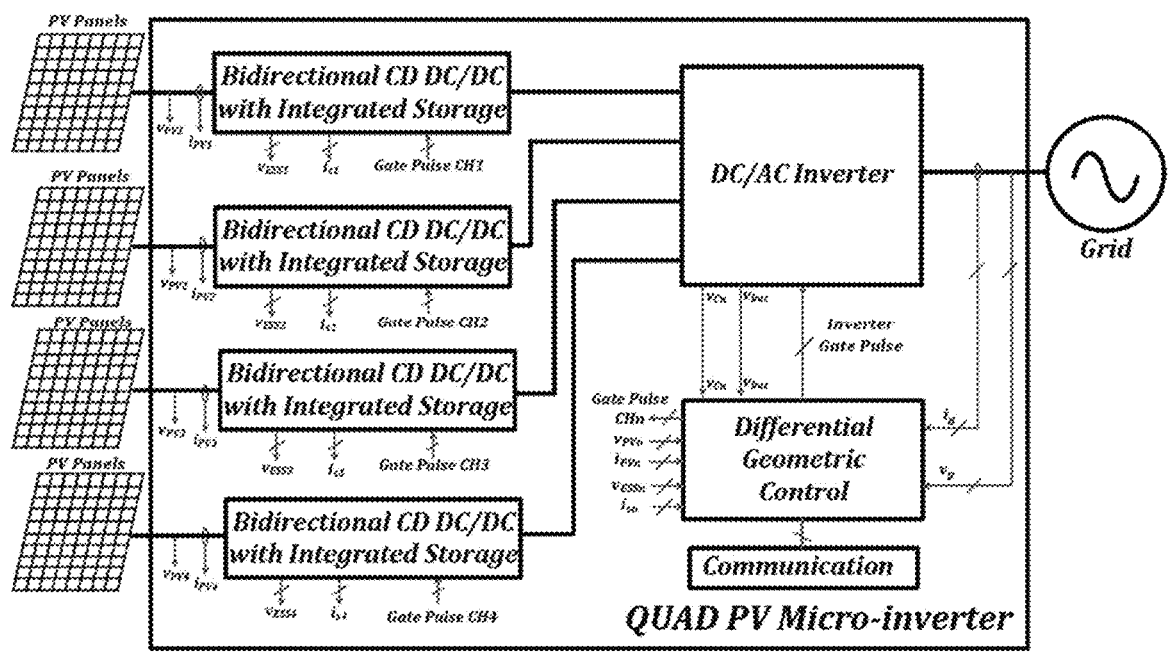
FIG. 13 is a block diagram of a quad PV micro-inverter using bidirectional multi-level current-driven DC/DC converters.

It should be noted that for the various configurations shown in FIG. 6 to FIG. 12A and FIG. 12B, the energy storage components can only be charged from the attached PV panel (i.e., the energy storage components cannot be charged from the AC utility grid). In order to provide flexibility to charge the energy storage from both the PV panels and the utility grid, the arrangement shown in FIG. 13 may be used. In this architecture, Bidirectional Multi-Level Current-Driven DC/DC Converters with integrated energy storage are used to provide the system with the capability to charge energy storage cells from both the PV panels and the utility grid.

Figure 14A:
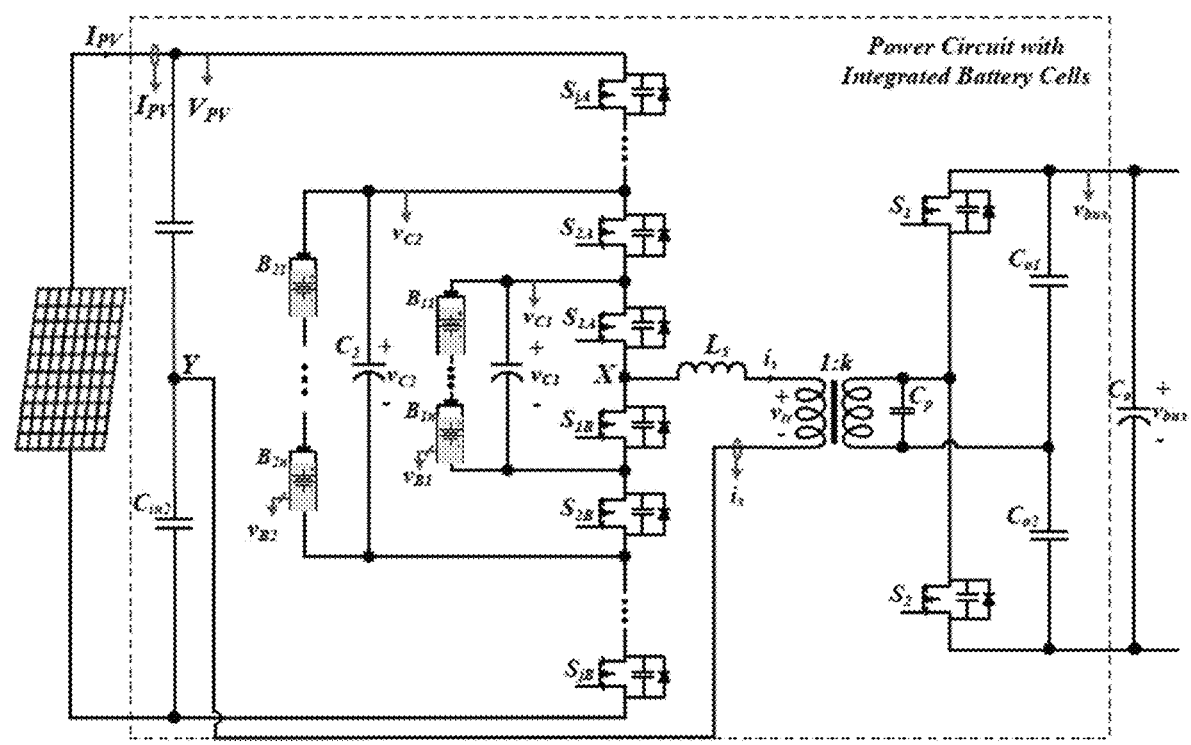
FIG. 14A is a schematic diagram of a bidirectional multi-level current-driven half-bridge DC/DC converter with integrated battery cells according to another aspect of the present invention.

Referring to FIG. 14A, a schematic diagram of a Bidirectional Multi-Level (ML) Current-Driven (CD) DC/DC Converter with Integrated Battery Cells is illustrated. This arrangement is a half-bridge configuration (i.e., it only includes one active leg). However, the full-bridge version can be similarly used. The ML CD DC/DC converter is responsible for performing MPPT for the attached PV panel for controlling the charge-discharge of respective integrated battery cells. FIG. 14A illustrates the power circuit of the ML CD DC/DC converter with Integrated Battery Cells, with the power circuit including:

an active multi-level leg, which includes the power semiconductors $S_{iA}$ and $S_{iB}$. These semiconductor switches are controlled such that an appropriate high frequency voltage is created across XY with X and Y being connection points as illustrated in FIG. 14A;

a capacitive voltage divider including capacitors $C_{in1}$, $C_{in2}$, with the voltage divider being responsible for attenuating the voltage ripple across the attached PV panel and also for eliminating any DC current from the high frequency transformer in the converter;

strings of battery cells along with the respective capacitors, with the strings of battery cells being responsible for storing energy and releasing that energy when needed;

a series inductance $L_s$, a parallel capacitance $C_p$, and a high frequency transformer, all of which shape the high frequency current in order to provide the appropriate voltage gain for the DC/DC converter;

an active voltage doubler for rectifying the high frequency current/voltage and for converting the current/voltage to DC power and for controlling the direction of power flow. Note, however, that even though a current doubler arrangement is used in this configuration, a full-bridge arrangement without the capacitors can be used instead at the secondary side.

Figure 14B:
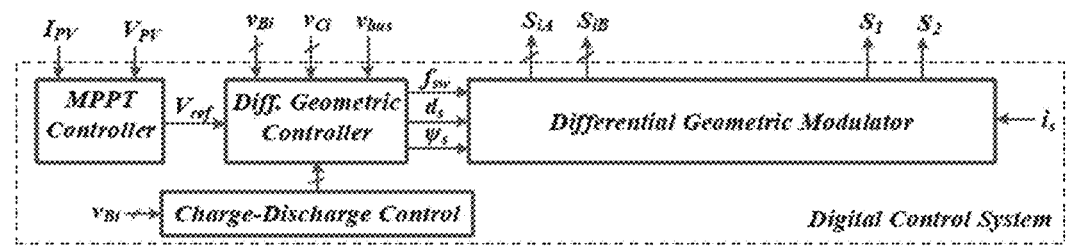
FIG. 14B is a block diagram of a digital control system for controlling the DC/DC converter illustrated in FIG. 14A.

The ML CD DC/DC converter in FIG. 14A uses a digital control system, illustrated in FIG. 14B and which includes:

an MPPT Controller, which receives the voltage and current signals from the PV panel and also produces the appropriate voltage reference across the PV panel;

a Charge-Discharge Control block, which is responsible for controlling the charge and discharge regimes of the battery cells;

a Differential Geometric Controller block, which produces the appropriate switching frequency and duty cycle for the converter based on the voltage reference and other signals from the power circuit and the Charge-Discharge Control block;

a Differential Geometric Modulator block, which is responsible for generating appropriate gate pulses for the power semiconductors based on the calculated switching frequency $f_{sw}$, the duty cycle $d_s$, the phase-shift between the primary side and the secondary side semiconductor legs, and the high frequency current $i_s$.

Figure 15B:
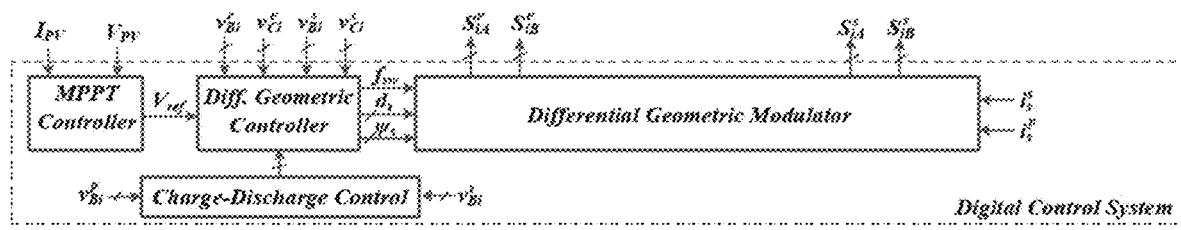
FIG. 15B is a block diagram of a digital control system for controlling the DC/DC converter illustrated in FIG. 14A.
Figure 15A:
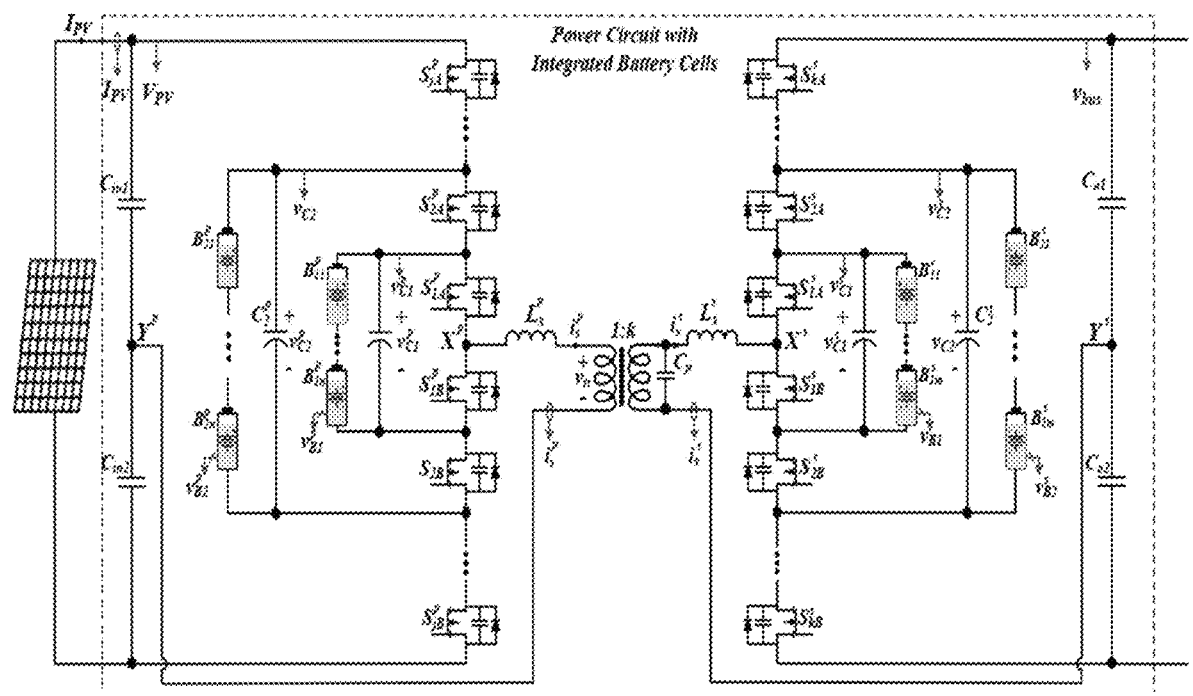
FIG. 15A is a schematic diagram of a bidirectional multi-level current-driven full-bridge DC/DC converter with integrated battery cells according to another aspect of the present invention.

Referring to FIG. 15A, a schematic diagram of another arrangement for the Bidirectional Multi-Level (ML) Current-Driven (CD) DC/DC Converter with Integrated Battery Cells is illustrated. In this arrangement the secondary side is also multi-level. As can be seen from FIG. 15A, the circuit on the primary side of the transformer is identical to the primary side of the transformer for the circuit in FIG. 7A. As can also be seen from FIG. 15A, the circuit on the secondary side of the transformer, aside from the PV panel, is identical to the circuit on the primary side of the transformer.

Referring to FIG. 15B, illustrated is a block diagram of a digital control system for controlling the converter power circuit illustrated in FIG. 15A. As can be seen, this digital control system is very similar to the digital control system illustrated in FIG. 14B.

Although the power circuits in FIG. 14A and FIG. 15A show various DC/DC converter structures with integrated battery cells, these circuits can be modified to use supercapacitor cells and/or hybrid combination of supercapacitor cells and battery cells.

It should be clear that the circuits and systems in FIG. 14A, FIG. 15A, along with their associated digital control systems and their variations that use different energy storage units (whether the energy storage units are strings of battery cells, strings of supercapacitor cells, or a combination of strings of battery cells and strings of supercapacitor cells) may be used as converters for the inverter system shown in FIG. 6. Using the bidirectional converters shown in FIG. 14A and FIG. 15A with the inverter in FIG. 6 would result in the inverter of FIG. 13.

A person understanding this invention may now conceive of alternative structures and embodiments or variations of the above all of which are intended to fall within the scope of the invention as defined in the claims that follow.

We claim:

1. A microinverter system for receiving input DC power and for producing AC power suitable for an AC power grid, the system comprising:
    a plurality of multi-level current driven DC/DC converters, each of said plurality of DC/DC converters receiving said input DC power from DC power sources, at least one of said plurality of DC/DC converters comprising an integrated energy storage subsystem;
    a DC/AC inverter receiving outputs of said plurality of DC/DC converters and producing said AC power, an output of said DC/AC inverter being received by said AC power grid;
    a differential geometric control system for controlling said DC/AC inverter and for controlling said plurality of DC/DC converters;
    wherein said control system controls each of said plurality of DC/DC converters to perform maximum power point tracking to extract maximum input DC power from said DC power sources.

2. The microinverter system according to claim 1, wherein at least one of said plurality DC/DC converters comprises:
    a transformer having a primary side and a secondary side, said primary side of said transformer receiving an input current, said secondary side of said transformer producing an output current;
    a plurality of pairs of circuit element modules, each of said circuit element modules comprising a semiconductor;
    a plurality of energy storage sub-circuits, each energy storage sub-circuit being associated with a specific pair of circuit element modules;
    a pair of input capacitors coupled in series to each other;
    an input inductor;
    two pairs of diodes, each pair of diodes being coupled in series;
    a first output capacitor and a second output capacitor;
    wherein
    each of said plurality of pairs of circuit element modules is coupled in series to other circuit element modules to form a chain of circuit element modules;
    each energy storage sub-circuit is coupled between a first coupling point and a second coupling point in said chain of circuit element modules and each energy storage subcircuit and each pair of circuit element modules are arranged in said chain such that for each specific energy storage subcircuit, a specific pair of circuit element modules associated with said specific energy storage subcircuit is coupled in said chain between a specific first coupling point and a specific second coupling point between which said specific energy storage sub-circuit is coupled;
    and wherein
    on said primary side of said transformer, said DC/DC converter comprises:
        said pair of input capacitors being coupled in parallel to said chain;
        said input inductor is coupled between a first end of said transformer primary side and a first coupling point that is in a middle of said chain;
        a second end of said transformer primary side is coupled to a second coupling point that is between said pair of input capacitors
        an input is coupled in parallel to said pair of input capacitors;
    on said secondary side of said transformer, said DC/DC converter comprises:
        said first output capacitor being coupled between a first end of said transformer secondary side and a second end of said transformer secondary side;
        said two pairs of diodes being coupled in parallel to each other;
        said second output capacitor being coupled in parallel with said two pairs of diodes;
        said first end of said transformer secondary side being coupled to a first output coupling point that is between said first pair of diodes;
        said second end of said transformer secondary side being coupled to a second output coupling point that is between said second pair of diodes.

3. The microinverter system according to claim 2, wherein said at least one of said plurality of DC/DC converters is controlled by a control system for controlling said circuit element modules and said energy storage sub-circuits, said controller comprising:
    an MPPT controller for implementing maximum power point tracking on said converter and for producing a reference voltage;

an energy storage controller block for controlling charging and discharging of energy storage components in said energy storage sub-circuits;
a differential geometric controller for determining a switching frequency and a duty cycle for said converter based at least on said reference voltage;
a differential geometric modulator block for producing gate pulses for power semiconductors in said circuit element modules based on said switching frequency, said duty cycle, and a high frequency current sensed from said transformer.

4. The microinverter system according to claim 2, wherein each energy storage sub-circuit is a string of integrated battery cells and an energy storage capacitor, said string of integrated battery cells and said energy storage capacitor being coupled in parallel with each other, said string of integrated battery cells comprising at least two battery cells coupled in series;
and wherein said energy storage components are integrated battery cells.

5. The microinverter system according to claim 2, wherein each energy storage sub-circuit is a string of integrated supercapacitor cells, said string of integrated supercapacitor cells comprising at least two supercapacitor cells coupled in series;
and wherein said energy storage components are integrated supercapacitor cells.

6. The microinverter system according to claim 2, wherein each energy storage sub-circuit is either:
a string of integrated supercapacitor cells, said string of integrated supercapacitor cells comprising at least two supercapacitor cells coupled in series; or
a string of integrated battery cells and an energy storage capacitor, said string of integrated battery cells and said energy storage capacitor being coupled in parallel with each other, said string of integrated battery cells comprising at least two battery cells coupled in series;
and wherein said energy storage components are either integrated supercapacitor cells or integrated battery cells.

7. The microinverter system according to claim 1, wherein at least one of said plurality DC/DC converters comprises:
a transformer having a primary side and a secondary side, said primary side of said transformer receiving an input current, said secondary side of said transformer producing an output current;
a plurality of pairs of circuit element modules, each of said circuit element modules comprising a semiconductor;
a plurality of energy storage sub-circuits, each energy storage sub-circuit being associated with a specific pair of circuit element modules;
an input capacitor;
an input inductor;
two pairs of diodes, each pair of diodes being coupled in series;
a first output capacitor and a second output capacitor;
wherein
each of said plurality of circuit element modules is coupled in series to other circuit element modules to form a first chain of circuit element modules and a second chain of circuit element modules, said first chain being coupled in parallel with said second chain;
for both of said first chain and said second chain, each energy storage sub-circuit is coupled between a first coupling point and a second coupling point in said first or second chain of circuit element modules and each energy storage subcircuit and each pair of circuit element modules are arranged in said first chain or said second chain such that for each specific energy storage subcircuit, a specific pair of circuit element modules associated with said specific energy storage subcircuit is coupled in said first chain or said second chain between a specific first coupling point and a specific second coupling point between which said specific energy storage sub-circuit is coupled;
wherein
on said primary side of said transformer, said DC/DC converter comprises:
said first chain of circuit element modules and said second chain of circuit element modules;
said input capacitor being coupled in parallel with both of said first chain and said second chain;
said input inductor being coupled between a first end of said transformer primary side and a first coupling point that is in a middle of said first chain;
a second end of said transformer primary side being coupled to a second coupling point that is in a middle of said second chain;
on said secondary side of said transformer, said DC/DC converter comprises:
said two pairs of diodes;
said first output capacitor and said second output capacitor;
said first output capacitor being coupled between a first end of said transformer secondary side and a second end of said transformer secondary side;
said second output capacitor being coupled in parallel with said two pairs of diodes;
said first end of said transformer secondary side being coupled to a first output coupling point that is between said first pair of diodes;
said second end of said transformer secondary side being coupled to a second output coupling point that is between said second pair of diodes.

8. The microinverter system according to claim 7, wherein said at least one of said plurality of DC/DC converters is controlled by a control system for controlling said circuit element modules and said energy storage sub-circuits, the control system comprising:
an MPPT controller for implementing maximum power point tracking on said converter and for producing a reference voltage;
an energy storage controller block for controlling charging and discharging of energy storage components in said energy storage sub-circuits;
a differential geometric controller for determining a switching frequency and duty cycle for said converter based at least on said reference voltage;
a differential geometric modulator block for producing gate pulses for power semiconductors in said circuit element modules based on said switching frequency, said duty cycle, and a high frequency current sensed from said transformer.

9. The microinverter system according to claim 7, wherein each energy storage sub-circuit is a string of integrated battery cells and an energy storage capacitor, said string of integrated battery cells and said energy storage capacitor being coupled in parallel with each other, said string of integrated battery cells comprising at least two battery cells coupled in series;
and wherein said energy storage components are integrated battery cells.

10. The microinverter system according to claim 7, wherein each energy storage sub-circuit is a string of integrated supercapacitor cells, said string of integrated supercapacitor cells comprising at least two supercapacitor cells coupled in series;

and wherein said energy storage components are integrated supercapacitor cells.

11. The microinverter system according to claim 7, wherein each energy storage sub-circuit is one of:
a string of integrated supercapacitor cells, said string of integrated supercapacitor cells comprising at least two supercapacitor cells coupled in series; and
a string of integrated battery cells and an energy storage capacitor, said string of integrated battery cells and said energy storage capacitor being coupled in parallel with each other, said string of integrated battery cells comprising at least two battery cells coupled in series;
and wherein said energy storage components are either integrated supercapacitor cells or integrated battery cells.

12. The microinverter system according to claim 1, wherein at least one of said plurality DC/DC converters comprises:
a transformer having a primary side and a secondary side, said primary side of said transformer receiving an input current, said secondary side of said transformer producing an output current;
a plurality of pairs of circuit element modules, each of said circuit element modules comprising a semiconductor;
a plurality of energy storage sub-circuits, each energy storage sub-circuit being associated with a specific pair of circuit element modules;
a pair of input capacitors coupled in series to each other;
an input inductor;
a pair of diodes, each pair of diodes being coupled in series;
a pair of output circuit element modules;
a first output capacitor, a second output capacitor, a third output capacitor, and a fourth output capacitor;
wherein
each of said plurality of pairs of circuit element modules is coupled in series to other circuit element modules to form a chain of circuit element modules;
each energy storage sub-circuit is coupled between a first coupling point and a second coupling point in said chain of circuit element modules and each energy storage subcircuit and each pair of circuit element modules are arranged in said chain such that for each specific energy storage subcircuit, a specific pair of circuit element modules associated with said specific energy storage subcircuit is coupled in said chain between a specific first coupling point and a specific second coupling point between which said specific energy storage sub-circuit is coupled;
and wherein
on said primary side of said transformer, said DC/DC converter comprises:
said pair of input capacitors being coupled in parallel to said chain;
said input inductor is coupled between a first end of said transformer primary side and a first coupling point that is in a middle of said chain;
a second end of said transformer primary side is coupled to a second coupling point that is between said pair of input capacitors;
an input is coupled in parallel to said pair of input capacitors;

on said secondary side of said transformer, said DC/DC converter comprises:
said first output capacitor being coupled between a first end of said transformer secondary side and a second end of said transformer secondary side;
said third output capacitor and said fourth output capacitor being coupled in series;
said pair of output circuit element modules being coupled in series to each other, said pair of output circuit element modules being coupled in parallel to said third and said fourth output capacitors;
said second output capacitor being coupled in parallel with pair of output circuit element modules;
said first end of said transformer secondary side being coupled to a first output coupling point that is between said pair of output circuit element modules;
said second end of said transformer secondary side being coupled to a second output coupling point that is between said third output capacitor and said fourth output capacitor.

13. The microinverter according to claim 12, wherein said at least one of said plurality of DC/DC converters is controlled by a control system for controlling said circuit element modules and said energy storage sub-circuits, the control system comprising:
an MPPT controller for implementing maximum power point tracking on said converter and for producing a reference voltage;
an energy storage controller block for controlling charging and discharging of energy storage components in said energy storage sub-circuits;
a differential geometric controller for determining a switching frequency and duty cycle for said converter based at least on said reference voltage;
a differential geometric modulator block for producing gate pulses for power semiconductors in said circuit element modules based on said switching frequency, said duty cycle, and a high frequency current sensed from said transformer.

14. The microinverter according to claim 12 wherein each energy storage sub-circuit is a string of integrated supercapacitor cells, said string of integrated supercapacitor cells comprising at least two supercapacitor cells coupled in series;
and wherein said energy storage components are integrated supercapacitor cells.

15. The microinverter according to claim 12 wherein each energy storage sub-circuit is a string of integrated battery cells and an energy storage capacitor, said string of integrated battery cells and said energy storage capacitor being coupled in parallel with each other, said string of integrated battery cells comprising at least two battery cells coupled in series;
and wherein said energy storage components are integrated battery cells.

16. The microinverter according to claim 12 wherein each energy storage sub-circuit is one of:
a string of integrated supercapacitor cells, said string of integrated supercapacitor cells comprising at least two supercapacitor cells coupled in series;
a string of integrated battery cells and an energy storage capacitor, said string of integrated battery cells and said energy storage capacitor being coupled in parallel with each other, said string of integrated battery cells comprising at least two battery cells coupled in series;
and wherein said energy storage components are either integrated supercapacitor cells or integrated battery cells.

17. A DC/DC converter comprising:
a transformer having a primary side and a secondary side, said primary side of said transformer receiving an input current, said secondary side of said transformer producing an output current;
a plurality of pairs of circuit element modules, each of said circuit element modules comprising a semiconductor;
a plurality of energy storage sub-circuits, each energy storage sub-circuit being associated with a specific pair of circuit element modules;
a pair of input capacitors coupled in series to each other;
an input inductor;
two pairs of diodes, each pair of diodes being coupled in series;
a first output capacitor and a second output capacitor;
wherein
each of said plurality of pairs of circuit element modules is coupled in series to other circuit element modules to form a chain of circuit element modules;
each energy storage sub-circuit is coupled between a first coupling point and a second coupling point in said chain of circuit element modules and each energy storage subcircuit and each pair of circuit element modules are arranged in said chain such that for each specific energy storage subcircuit, a specific pair of circuit element modules associated with said specific energy storage subcircuit is coupled in said chain between a specific first coupling point and a specific second coupling point between which said specific energy storage sub-circuit is coupled;
and wherein
on said primary side of said transformer, said DC/DC converter comprises:
said pair of input capacitors being coupled in parallel to said chain;
said input inductor is coupled between a first end of said transformer primary side and a first coupling point that is in a middle of said chain;
a second end of said transformer primary side is coupled to a second coupling point that is between said pair of input capacitors
an input is coupled in parallel to said pair of input capacitors;
on said secondary side of said transformer, said DC/DC converter comprises:
said first output capacitor being coupled between a first end of said transformer secondary side and a second end of said transformer secondary side;
said two pairs of diodes being coupled in parallel to each other;
said second output capacitor being coupled in parallel with said two pairs of diodes;
said first end of said transformer secondary side being coupled to a first output coupling point that is between said first pair of diodes;
said second end of said transformer secondary side being coupled to a second output coupling point that is between said second pair of diodes;
wherein said DC/DC converter further comprises a controller for controlling said circuit element modules and said energy storage sub-circuits, said controller comprising:
an MPPT controller for implementing maximum power point tracking on said converter and for producing a reference voltage;
an energy storage controller block for controlling charging and discharging of energy storage components in said energy storage sub-circuits;
a differential geometric controller for determining a switching frequency and duty cycle for said converter based at least on said reference voltage;
a differential geometric modulator block for producing gate pulses for power semiconductors in said circuit element modules based on said switching frequency, said duty cycle, and a high frequency current sensed from said transformer.

18. The DC/DC converter according to claim 17 wherein each energy storage sub-circuit is a string of integrated supercapacitor cells, said string of integrated supercapacitor cells comprising at least two supercapacitor cells coupled in series;
and wherein said energy storage components are integrated supercapacitor cells.

19. The DC/DC converter according to claim 17 wherein each energy storage sub-circuit is a string of integrated battery cells and an energy storage capacitor, said string of integrated battery cells and said energy storage capacitor being coupled in parallel with each other, said string of integrated battery cells comprising at least two battery cells coupled in series;
and wherein said energy storage components are integrated battery cells.

20. The DC/DC converter according to claim 17 wherein each energy storage sub-circuit is one of:
a string of integrated supercapacitor cells, said string of integrated upercapacitor cells comprising at least two supercapacitor cells coupled in series; or
a string of integrated battery cells and an energy storage capacitor, said string of integrated battery cells and said energy storage capacitor being coupled in parallel with each other, said string of integrated battery cells comprising at least two battery cells coupled in series;
and wherein said energy storage components are either integrated supercapacitor cells or integrated battery cells.

21. A current driven DC/DC converter comprising:
a transformer having a primary side and a secondary side, said primary side of said transformer receiving an input current, said secondary side of said transformer producing an output current;
a plurality of pairs of circuit element modules, each of said circuit element modules comprising a semiconductor;
a plurality of energy storage sub-circuits, each energy storage sub-circuit being associated with a specific pair of circuit element modules;
an input capacitor;
an input inductor;
two pairs of diodes, each pair of diodes being coupled in series;
a first output capacitor and a second output capacitor;
wherein
each of said plurality of circuit element modules is coupled in series to other circuit element modules to form a first chain of circuit element modules and a second chain of circuit element modules, said first chain being coupled in parallel with said second chain;
for both of said first chain and said second chain, each energy storage sub-circuit is coupled between a first coupling point and a second coupling point in said first or second chain of circuit element modules and each energy storage subcircuit and each pair of circuit element modules are arranged in said first chain or said second chain such that for each specific energy storage subcircuit, a specific pair of circuit element modules associated with said specific energy storage subcircuit is coupled in said first chain or said second chain between a specific first coupling point and a specific second coupling point between which said specific energy storage sub-circuit is coupled;

wherein on said primary side of said transformer, said DC/DC converter comprises:
  said first chain of circuit element modules and said second chain of circuit element modules;
  said input capacitor being coupled in parallel with both of said first chain and said second chain;
  said input inductor being coupled between a first end of said transformer primary side and a first coupling point that is in a middle of said first chain;
  a second end of said transformer primary side being coupled to a second coupling point that is in a middle of said second chain;

on said secondary side of said transformer, said DC/DC converter comprises:
  said two pairs of diodes;
  said first output capacitor and said second output capacitor;
  said first output capacitor being coupled between a first end of said transformer secondary side and a second end of said transformer secondary side;
  said second output capacitor being coupled in parallel with said two pairs of diodes;
  said first end of said transformer secondary side being coupled to a first output coupling point that is between said first pair of diodes;
  said second end of said transformer secondary side being coupled to a second output coupling point that is between said second pair of diodes;

wherein said DC/DC converter further comprises a controller for controlling said circuit element modules and said energy storage sub-circuits, the controller comprising:
  an MPPT controller for implementing maximum power point tracking on said converter and for producing a reference voltage;
  an energy storage controller block for controlling charging and discharging of energy storage components in said energy storage sub-circuits;
  a differential geometric controller for determining a switching frequency and duty cycle for said converter based at least on said reference voltage;
  a differential geometric modulator block for producing gate pulses for power semiconductors in said circuit element modules based on said switching frequency, said duty cycle, and a high frequency current sensed from said transformer.

22. The DC/DC converter according to claim 21 wherein each energy storage sub-circuit is a string of integrated supercapacitor cells, said string of integrated supercapacitor cells comprising at least two supercapacitor cells coupled in series;
and wherein said energy storage components are integrated supercapacitor cells.

23. The DC/DC converter according to claim 21 wherein each energy storage sub-circuit is a string of integrated battery cells and an energy storage capacitor, said string of integrated battery cells and said energy storage capacitor being coupled in parallel with each other, said string of integrated battery cells comprising at least two battery cells coupled in series;
and wherein said energy storage components are integrated battery cells.

24. The DC/DC converter according to claim 21 wherein each energy storage sub-circuit is one of:
  a string of integrated supercapacitor cells, said string of integrated supercapacitor cells comprising at least two supercapacitor cells coupled in series;
  a string of integrated battery cells and an energy storage capacitor, said string of integrated battery cells and said energy storage capacitor being coupled in parallel with each other, said string of integrated battery cells comprising at least two battery cells coupled in series;
and wherein said energy storage components are either integrated supercapacitor cells or integrated battery cells.

25. A DC/DC converter comprising:
  a transformer having a primary side and a secondary side, said primary side of said transformer receiving an input current, said secondary side of said transformer producing an output current;
  a plurality of pairs of circuit element modules, each of said circuit element modules comprising a semiconductor;
  a plurality of energy storage sub-circuits, each energy storage sub-circuit being associated with a specific pair of circuit element modules;
  a pair of input capacitors coupled in series to each other;
  an input inductor;
  a pair of diodes, each pair of diodes being coupled in series;
  a pair of output circuit element modules;
  a first output capacitor, a second output capacitor, a third output capacitor, and a fourth output capacitor;

wherein each of said plurality of pairs of circuit element modules is coupled in series to other circuit element modules to form a chain of circuit element modules;
each energy storage sub-circuit is coupled between a first coupling point and a second coupling point in said chain of circuit element modules and each energy storage subcircuit and each pair of circuit element modules are arranged in said chain such that for each specific energy storage subcircuit, a specific pair of circuit element modules associated with said specific energy storage subcircuit is coupled in said chain between a specific first coupling point and a specific second coupling point between which said specific energy storage sub-circuit is coupled;

and wherein on said primary side of said transformer, said DC/DC converter comprises:
  said pair of input capacitors being coupled in parallel to said chain;
    said input inductor is coupled between a first end of said transformer primary side and a first coupling point that is in a middle of said chain;
    a second end of said transformer primary side is coupled to a second coupling point that is between said pair of input capacitors;
    an input is coupled in parallel to said pair of input capacitors;
  on said secondary side of said transformer, said DC/DC converter comprises:

said first output capacitor being coupled between a first end of said transformer secondary side and a second end of said transformer secondary side;

said third output capacitor and said fourth output capacitor being coupled in series;

said pair of output circuit element modules being coupled in series to each other, said pair of output circuit element modules being coupled in parallel to said third and said fourth output capacitors;

said second output capacitor being coupled in parallel with pair of output circuit element modules;

said first end of said transformer secondary side being coupled to a first output coupling point that is between said pair of output circuit element modules;

said second end of said transformer secondary side being coupled to a second output coupling point that is between said third output capacitor and said fourth output capacitor;

wherein said DC/DC converter further comprises a controller for controlling said circuit element modules and said energy storage sub-circuits, said controller comprising:

an MPPT controller for implementing maximum power point tracking on said converter and for producing a reference voltage;

an energy storage controller block for controlling charging and discharging of energy storage components in said energy storage sub-circuits;

a differential geometric controller for determining a switching frequency and duty cycle for said converter based at least on said reference voltage;

a differential geometric modulator block for producing gate pulses for power semiconductors in said circuit element modules based on said switching frequency, said duty cycle, and a high frequency current sensed from said transformer.

26. The DC/DC converter according to claim 25 wherein each energy storage sub-circuit is a string of integrated supercapacitor cells, said string of integrated supercapacitor cells comprising at least two supercapacitor cells coupled in series;

and wherein said energy storage components are integrated supercapacitor cells.

27. The DC/DC converter according to claim 25 wherein each energy storage sub-circuit is a string of integrated battery cells and an energy storage capacitor, said string of integrated battery cells and said energy storage capacitor being coupled in parallel with each other, said string of integrated battery cells comprising at least two battery cells coupled in series;

and wherein said energy storage components are integrated battery cells.

28. The DC/DC converter according to claim 25 wherein each energy storage sub-circuit is one of:

a string of integrated supercapacitor cells, said string of integrated supercapacitor cells comprising at least two supercapacitor cells coupled in series;

a string of integrated battery cells and an energy storage capacitor, said string of integrated battery cells and said energy storage capacitor being coupled in parallel with each other, said string of integrated battery cells comprising at least two battery cells coupled in series;

and wherein said energy storage components are either integrated supercapacitor cells or integrated battery cells.

* * * * *